(12) United States Patent
Phuly

(10) Patent No.: US 10,640,995 B2
(45) Date of Patent: *May 5, 2020

(54) METHOD OF CONSTRUCTING A WIND TOWER FOUNDATION WITH PEDESTAL AND RIBS

(71) Applicant: Ahmed M. Phuly, Andover, MN (US)

(72) Inventor: Ahmed M. Phuly, Andover, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/407,692

(22) Filed: May 9, 2019

(65) Prior Publication Data

US 2019/0263020 A1    Aug. 29, 2019

Related U.S. Application Data

(63) Continuation of application No. 15/916,724, filed on Mar. 9, 2018, which is a continuation of application
(Continued)

(51) Int. Cl.
*B28B 1/14*   (2006.01)
*E04G 21/12*  (2006.01)
(Continued)

(52) U.S. Cl.
CPC .............. *E04G 21/12* (2013.01); *B28B 1/14* (2013.01); *E02B 17/025* (2013.01); *E02B 17/027* (2013.01); *E02D 27/02* (2013.01); *E02D 27/08* (2013.01); *E02D 27/26* (2013.01); *E02D 27/28* (2013.01); *E02D 27/42* (2013.01); *E02D 27/425* (2013.01); *E04G 21/02* (2013.01); *E04H 12/341* (2013.01); *F03D 13/22* (2016.05); *E02B 2017/006* (2013.01); *E02B 2017/0069* (2013.01); *E02B 2017/0073* (2013.01);
(Continued)

(58) Field of Classification Search
CPC ........... B28B 1/14; E04G 21/12; F03D 13/22; E02D 27/02; E02D 27/26; E02D 27/42; E02D 27/425
USPC ................................. 264/31, 32, 34
See application file for complete search history.

(56) References Cited

U.S. PATENT DOCUMENTS 4,911,585 A   3/1990   Vidal et al.
6,672,023 B2  1/2004   Henderson
(Continued)

FOREIGN PATENT DOCUMENTS

DE   7637601   3/1977
DE   3336655   4/1985

*Primary Examiner* — Michael Safavi
(74) *Attorney, Agent, or Firm* — Thomas J. Nikolai; DeWitt LLP

(57) ABSTRACT

A wind turbine foundation comprising a concrete support slab having a horizontal rebar grid therein, a concrete pedestal integral with the support slab and having vertical post tensioning elements therein and a plurality of concrete ribs on top of and integral with the support slab and integral with the pedestal, the ribs having rebar therein and extend outwardly from the pedestal, the pedestal, slab and ribs are connected to each other to form a monolithic foundation. The foundation design reduces the weight and volume of materials used, reduces cost, and improves heat dissipation conditions during construction by having a small ratio of concrete mass to surface area thus eliminating the risk of thermal cracking due to heat of hydration.

29 Claims, 40 Drawing Sheets

Related U.S. Application Data

No. 15/530,081, filed on Dec. 1, 2016, now Pat. No. 9,937,635, which is a continuation of application No. 15/137,157, filed on Apr. 25, 2016, now Pat. No. 9,534,405, which is a continuation of application No. 14/748,241, filed on Jun. 24, 2015, now Pat. No. 9,347,197, which is a continuation of application No. 14/176,160, filed on Feb. 10, 2014, now Pat. No. 9,096,985, which is a continuation of application No. 13/319,083, filed as application No. PCT/US2010/041006 on Jul. 5, 2010, now Pat. No. 8,661,752, which is a continuation-in-part of application No. 12/774,727, filed on May 6, 2010, now abandoned, which is a continuation-in-part of application No. 11/859,588, filed on Sep. 21, 2007, now abandoned.

(60) Provisional application No. 61/339,550, filed on Mar. 5, 2010, provisional application No. 61/284,901, filed on Dec. 28, 2009, provisional application No. 61/269,800, filed on Jun. 29, 2009, provisional application No. 61/215,430, filed on May 5, 2009, provisional application No. 60/954,502, filed on Aug. 7, 2007, provisional application No. 60/826,452, filed on Sep. 21, 2006.

(51) Int. Cl.
| | | |
|---|---|---|
| *E02D 27/42* | (2006.01) | |
| *F03D 13/20* | (2016.01) | |
| *E02B 17/02* | (2006.01) | |
| *E04G 21/02* | (2006.01) | |
| *E04H 12/34* | (2006.01) | |
| *E02D 27/28* | (2006.01) | |
| *E02D 27/02* | (2006.01) | |
| *E02D 27/08* | (2006.01) | |
| *E02D 27/26* | (2006.01) | |
| *E02B 17/00* | (2006.01) | |
| *E04H 12/08* | (2006.01) | |
| *E04H 12/16* | (2006.01) | |

(52) U.S. Cl.
CPC ...... *E02B 2017/0091* (2013.01); *E04H 12/08* (2013.01); *E04H 12/16* (2013.01); *F05B 2230/50* (2013.01); *F05B 2240/912* (2013.01); *Y02B 10/30* (2013.01); *Y02E 10/728* (2013.01); *Y02P 70/523* (2015.11)

(56) References Cited

U.S. PATENT DOCUMENTS 9,938,685 B2 * 4/2018 Krause ............... E02D 27/425
2007/0181767 A1 8/2007 Wobben

* cited by examiner

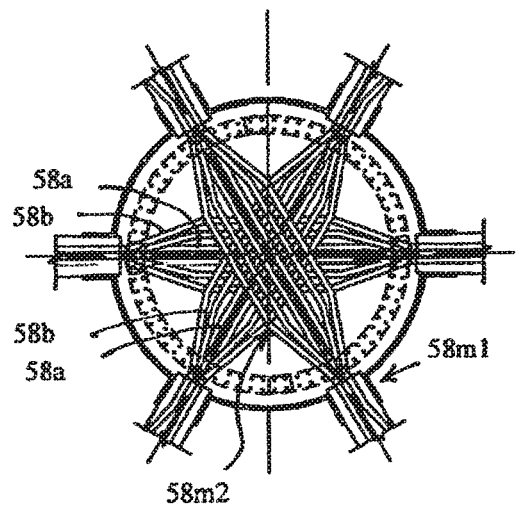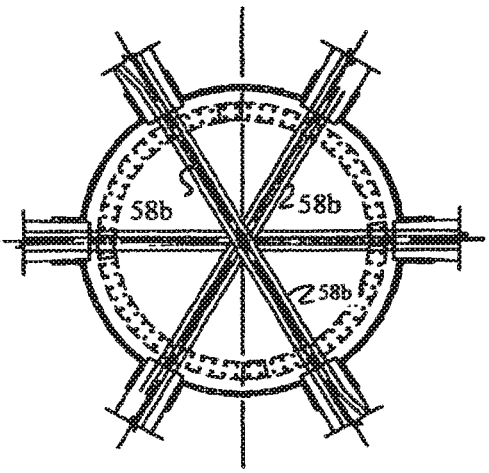
FIG. 17   FIG. 18
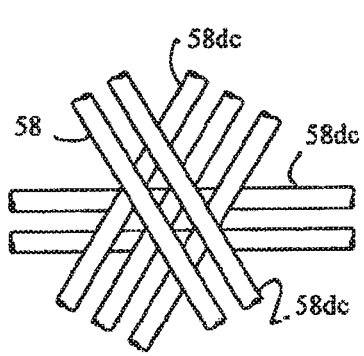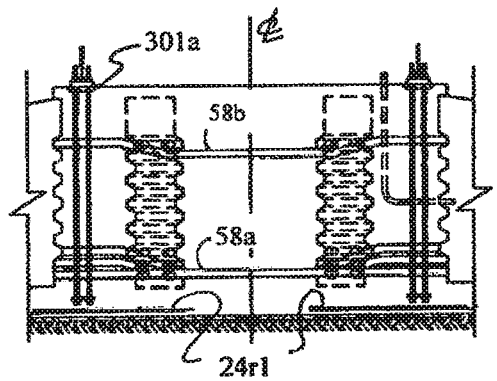
FIG. 19   FIG. 20

METHOD OF CONSTRUCTING A WIND TOWER FOUNDATION WITH PEDESTAL AND RIBS

CROSS-REFERENCED TO RELATED APPLICATIONS

This application is a continuation of Ser. No. 15/916,724, filed Mar. 9, 2018, which is a continuation of Ser. No. 15/530,081 filed Dec. 1, 2016, which is a continuation of application Ser. No. 15/137,157 filed Apr. 25, 2016 now U.S. Pat. No. 9,534,405 issued Jan. 3, 2017, which is a continuation of application Ser. No. 14/748,241 filed Jun. 24, 2015 now U.S. Pat. No. 9,347,197 issued May 24, 2016, which is a continuation of application Ser. No. 14/176,160 filed Feb. 10, 2014 now U.S. Pat. No. 9,096,985 issued Jul. 4, 2015, which is a continuation of application Ser. No. 13/319,083 filed Jul. 5, 2010 now U.S. Pat. No. 8,661,752 issued Mar. 4, 2014, which claims the benefit of provisional applications 61/215,430 filed May 5, 2009, 61/269,800 filed Jun. 29, 2009, 61/284,901 filed Dec. 28, 2009, 61/339,550 filed Mar. 5, 2010 and claims priority from PCT/US/2010/041006 and is a continuation-in-part of patent application Ser. No. 12/774,727 filed May 6, 2010, which is a continuation-in-part of patent application Ser. No. 11/859,588 filed Sep. 21, 2007 which claims the benefit of provisional applications 60/826,452 filed Sep. 21, 2006 and 60/954,502 filed Aug. 7, 2007.

STATEMENT REGARDING FEDERALLY SPONSORED RESEARCH OR DEVELOPMENT

Not applicable

BACKGROUND OF THE INVENTION

I. Field of the Invention

This invention relates to building fatigue resistant foundations for supporting columns, towers and structures under heavy cyclical loads such as for onshore and offshore wind turbine towers. Wind turbine support structures are subjected to high cyclical loading with the number of load cycles up to $10^9$. Therefore, the fatigue design becomes more important for concrete construction and the influence of multi-stage and multi-axial fatigue loading have to be considered. Studies have recommended modification of the design rules for concrete construction of wind turbine foundations in order to consider the influence of multi-axial loading.

Wind turbine manufacturers have successfully developed large wind turbines with rated power ranging from 1.5 to 10 MW, for onshore and offshore installations. The E-126 model turbine by Enercon with a 7 MW rated power required a 29 meter diameter circular foundation with 1,400 cubic meters of concrete and 120 tons of rebar. The RePower 5M turbine with a 5 MW rated power required a 23 meter diameter circular foundation with 1,300 cubic meters of concrete and 180 tons of rebar. The task of building such large foundations is monumental and requires a great deal of construction planning and logistics. The proposed foundation designs and their associated construction methods provide cost-effective solutions for such challenging foundation projects.

Some wind turbine installations that have been constructed in the last 10 years in the US and. Europe have encountered structural problems stemming from thermal cracking during construction, or from fatigue cracking requiring repairs. The present invention improves the geometry of the foundation in order to enhance dissipation conditions for the typical temperature rise due to heat of hydration after casting and also provides a cost effective fatigue resistant design.

Description of the Related Art

Conventional gravity style foundations for large wind turbines usually comprise a large, thick, horizontal, heavily reinforced cast in situ concrete base; and a vertical cast in situ cylindrical pedestal installed over the base. There are several problems typically encountered during the construction of such foundations.

Fatigue resistance of such conventional footings is achieved by over sizing the structural concrete elements and the reinforcing elements such that the resulting stress amplitudes are small enough for the structural elements to pass fatigue design checks.

The main problem is the monumental task of managing large continuous concrete pours, which require sophisticated planning and coordination in order to pour large amounts of concrete per footing, in one continuous pour, without having any cold joints within the pour.

Another problem is logistics coordinating with multiple local batch plants the delivery plan of the large number of concrete trucks to the job site in a timely and organized manner.

A further problem is the complexity of installing the rebar assembly into the foundation which requires assembling two layers of steel reinforcing meshes that are two to six feet apart across the full area of the foundation, while maintaining a strict geometric layout and specific spacing. This rebar assembly is made of extremely long and heavy rebar which requires the use of a crane in addition to multiple workers to install all the components of the assembly. The rebar often exceeds forty feet in length, thus requiring special oversized shipments which are very expensive and usually require special permits. The installation of the rebar is a labor intensive and time consuming task requiring a large number of well trained rebar placing workers.

Another important problem is the fact that the majority of the construction process consists of field work which can easily be compromised by weather conditions and other site conditions.

Another problem is thermal cracking of concrete due to overheating of the concrete mass. When concrete is cast in massive sections, the temperature can reach high levels and the risk of thermal cracking becomes very high. Thermal cracking often compromises the structural integrity of foundations as reported in many projects in Europe and North America.

Multi-cell caissons used in offshore installations always lack multi-axial post-tensioning elements and their fatigue resistance relies completely on heavily reinforced oversized concrete elements which involves expensive and labor intensive construction.

BRIEF SUMMARY OF THE INVENTION

It is desired to have a cost-effective foundation which reduces the amount of construction material used in the construction of wind turbines. This can be accomplished by the use of concrete rib stiffeners, with a cast in place slab on grade element and a central pedestal to build an integral foundation that will behave structurally as a monolithic foundation structure. Other concrete components can be included such as secondary and perimeter beams, diaphragms, or intermediate stiffeners and rib stiffened or flat slab sections. The foundation system may use prefabricated components including rebar meshes and cages, a pedestal cage assembly, precut post-tensioning strands, preassembled strand bundles, precut post-tensioning duct sections and prefabricated concrete forms.

The present invention pertains to a fatigue resistant foundation for wind towers which comprises a plurality of components, namely a central vertical pedestal, a substantially horizontal continuous bottom support slab with a stiffened perimeter, a plurality of radial reinforcing ribs, also referred to herein as girders or cantilevered girders, extending radially outwardly from the pedestal and a three-dimensional network of vertical, horizontal, diagonal, radial and circumferential post-tensioning elements embedded in the footing that keeps all the structural elements under heavy multi-axial post compression, which reduces stress amplitudes and deflections and allows the foundation to have a desirable combination of high stiffness and superior fatigue resistance while improving heat dissipation conditions during construction by having a small ratio of concrete mass to surface area thus eliminating the risk of thermal cracking due to heat of hydration.

Although the application is written with a wind turbine tower as the column being supported by the foundation, any tower or column can be used on the foundation including but not limited to, antennas, chimneys, stacks, distillation columns, water towers, electric power lines, bridges, buildings, or any other structure using a column.

In one embodiment of the invention a wind turbine foundation has a plurality of components, namely a central vertical pedestal, a substantially horizontal bottom support slab, and a plurality of radial reinforcing ribs extending radially outwardly from the pedestal, the ribs are prefabricated and transported to job site, but the pedestal and support slab are poured in situ at the site out of concrete. The prefabricated ribs 16 are equipped with load transfer mechanisms, for shear force and bending moment, along the conjunctions with the cast in situ support slab, pedestal and perimeter beams. The prefabricated ribs are also equipped at their inner ends with load transfer mechanisms, for shear force and bending moment, along the conjunctions with the cast in situ pedestal. The ribs are arranged in a circumferentially spaced manner around the outer diameter of the pedestal cage assembly before or after slab reinforcing steel is installed. Forms are then arranged for the pedestal and support slab. The support slab is cast in situ by pouring concrete into the forms and then pedestal concrete is poured into the pedestal form over the slab. When the concrete cures the support slab 20 is united to the prefabricated ribs 16 and the ribs 16 are also united to the pedestal 10. The final result is a continuous monolithic polygon or circular shaped foundation wherein loads are carried across the structure vertically and laterally through a continuous structure by the doweled and spliced reinforcing steel bars which are integrally cast into the pedestal 10, ribs 16 and support slab 20. The combination of the high stiffness of the ribs 16, solid pedestal 10 and continuous slab 20 construction across the pedestal 10, and through or under ribs 16, allows the slab 20 to behave structurally as a continuous slab over multiple rigid supports resulting in small bending and shear stresses in the slab 20, reducing deflections and increasing the stiffness of the foundation 100, improving fatigue conditions as well as allowing for the benefits of an economical design. Support slab reinforcing steel covers the entire footprint of the foundation and extends, without interruption, across the slab area and into the pedestal 10 to improve the structural performance of the foundation 100 under different loading conditions. Perimeter beams 190 or thickened slab edges 21 around the perimeter add stiffness and strength to the foundation 100 and provide the benefits of a two-way slab system. Circumferential post-tensioning of the slab edge 21 is used to increase the structural capacity of the ribs 16 and the pedestal 10 by creating eccentric post-compression force in the ribs 16 and by reducing stress amplitudes in the slab 20, ribs 16 and pedestal 10.

The foundation of the present invention substantially reduces the amount of concrete used in a wind turbine foundations of spread footing style, simplifies the placement of rebar and concrete in the foundation, allows for labor and time savings and shortens the foundation construction schedule when compared to conventional foundation designs.

This invention provides the wind energy industry with a foundation system suitable for utility scale wind turbines including 1.5 MW through 10 MW or larger turbines, wherein the amount of cast in situ concrete work is limited, and the number of concrete trucks required for the foundation is kept to a smaller and more manageable level, and the amount of rebar used in the foundation is around 60% less than conventional footings.

The present invention uses prefabricated components that meet size and weight limits for standard ground freight shipping on typical roads and highways, without resorting to special permitting for oversize or overweight shipments, keeping in mind that the foundation width for large turbines can easily exceed sixty feet.

One embodiment of the invention uses specific combinations of precast components with cast in situ components designed to speed up construction without compromising the rigidity and structural continuity and optimization of the foundation. The combination of high strength, high stiffness prefabricated ribs, solid pedestal construction and continuous slab construction across the pedestal, and through or under the ribs, allows the slab to behave structurally as a continuous slab under multiple rigid supports resulting in small bending and shear stresses in the slab, reducing deflections and increasing the stiffness of the foundation, substantially reducing fatigue as well as allowing for the benefits of rapid construction and economical design.

The present invention improves the geometry of the foundation in order to enhance dissipation conditions for the heat of hydration due to the typical temperature rise after casting. This design feature is achieved by reducing the thickness of the support slab and the ratio of concrete mass to surface area, thus reducing the risk of thermal cracking and protecting the structural integrity of the foundations.

The present invention optimizes the design support slab by configuring slab reinforcing to span between supporting ribs, and allowing it to continue under or across the ribs. Each slab panel may be triangular or pie-shaped and is prestressed along all three sides such that a multi-axial prestress is generated in each slab panel. Slab panels with radial and perimeter post tensioning elements form a robust horizontal trussed diaphragm and as a result, the required slab thickness is optimized and the amount of cast in situ concrete is reduced.

The present invention reduces the maximum rebar length for field installation to approximately half the conventional length, to roughly 7.6 meters (twenty five feet), which is significantly shorter when compared to conventional footing that may requires 15.2 to 18.3 meters (fifty to sixty foot) long reinforcing bars.

The present invention allows rib dowels, or post tensioning tendons, extending inwardly into the pedestal at one end, to continue without interruption between distal ends of the foundation. As a result each pair of ribs 16 on opposite ends of the pedestal 10 will behave structurally as one continuous beam across the width of the foundation 100.

The present invention reduces fatigue for concrete and rebar in the foundation by minimizing stress concentrations through appropriately configured connections and component geometry. The solid and deep construction of the pedestal allows for great reduction of stresses across the pedestal and at the conjunctions between the pedestal and the surrounding slab and ribs. Dowels from the ribs into the pedestal are relatively deep to reduce stresses in the surface zone of the pedestal and can be paired with corresponding dowels extending from the opposite end of the foundation. The solid pedestal offers desirable bearing conditions for the tower base plate and improves the geometry as needed to minimize fatigue.

The present invention employs prestressing and/or post tensioning techniques in order to maximize the performance of the foundation, and to extend its life span. Besides the vertical tensioning of anchor bolts, tensioning of horizontal and diagonal tendons are employed along the length of the concrete ribs and across the pedestal. Further, perimeter and radial post tensioning elements embedded in the slab are employed. Post-tensioning of the ribs is designed in an eccentric manner to counter balance and reduce the stresses from the dead loads on the foundation. This can be accomplished by setting an eccentric post tensioning load pattern in the ribs with higher axial force at the bottom than at the top of the rib. The circumferential post tensioning load in the slab provides additional desirable eccentric prestressing of the ribs and the pedestal and helps increase rib load capacity and rib fatigue resistance.

OBJECTS OF THE INVENTION

An object of this invention is to provide the wind energy industry with a short construction time, reliable, and cost effective foundation system suitable for most wind energy projects, including projects using the largest utility scale turbines and tallest towers, while providing a foundation lifespan that is longer than conventional foundation systems.

Another object of this invention is to reduce the cost of wind energy projects by realizing savings in the areas of reducing concrete and rebar quantity, reducing concrete trucking service, decreasing concrete pouring and finishing, improving logistics, and reducing man-hours and crane operations.

It is the object of this invention to provide a foundation suitable for large wind turbines including utility scale turbines ranging from 1.5 MW to 10 MW and larger, wherein the amount of cast in situ concrete work is limited and the number of concrete trucks and the amount of rebar required for the foundation is reduced to a manageable level when compared to conventional gravity style foundations.

Another object of this invention is to improve dissipation conditions for the heat of hydration and the typical temperature rise after casting. This goal is achieved by reducing the ratio of concrete mass to surface area. When concrete is cast in massive sections for wind tower foundations, temperatures can reach high levels and the risk of thermal cracking becomes very high unless cooling techniques or special admixtures are applied. Thermal cracking often compromises the structural integrity of the foundations.

A further object of one embodiment of this invention is to improve foundation structural properties due to fabrication of some structural components in a fully controlled environment of a precast concrete plant or a suitable facility at or near the project site and to utilize and benefit from advancement in concrete construction in areas such as concrete admixtures, special cements and fiber reinforcement.

Still another object of this invention is to utilize desirable features and benefits associated with mass production of precast concrete such as high reliability and uniform consistency and high compressive strength.

Another important object of this invention is to minimize chances for errors in bar placement, spacing and layout by providing pre-marked spacing for splicing slab rebar with existing dowels extending from ribs.

A further object of this invention is to use light weight, small diameter, short and easy to handle rebar for the cast in situ concrete.

A further object of this invention is to provide the wind energy industry with a solution for all weather foundation construction.

Still another object of this invention is to improve safety and accessibility around foundations under construction, and reduce hazardous conditions for construction crews.

A further object of this invention is to increase productivity and increase the number of footings that can be built in a given time frame using the same number of workers, when compared to conventional foundation designs built under similar conditions.

Another object of this invention is to employ prestressing and/or post tensioning techniques in order to maximize the performance of the foundation, improve its fatigue resistance and extend its life span.

Another object of this invention is to provide the wind energy industry with reliable and readily available designs, and optionally, prefabricated components, for every wind energy project, wherein foundation designs are pre-approved by and coordinated with turbine manufactures and certification agencies.

A further object of this invention is to use standard designs to reduce engineering work and simplify the permitting process, as well as improve the project construction schedule.

Still another object of this invention is to speedup construction by using many prefabricated components including rebar meshes and cages, bolt cage assemblies, pre-cut post-tensioning strands, preassembled post-tensioning bundles, pre-cut post-tensioning duct sections and prefabricated concrete forms and optionally, precast ribs.

It is also the object of this invention to provide wind energy developers with the ability to select pre-approved complete foundation designs for wind turbine foundations based on project and site variables including turbine model and tower height; site geotechnical characteristics; and desired foundation styles such as gravity, anchored or piling support foundations.

Another object of this invention is to provide foundation contractors with the convenience and economy of using commercially available prefabricated components with complete assembly and detail drawings that can be delivered to any project site with short lead times.

A further object of this invention is to improve the quality and productivity of foundation construction due to experience gained from practicing standard construction techniques with repetitive production steps.

Still another object of his invention is to produce foundation designs suitable for shallow and deep offshore installations.

Another object of this invention is to use the modular foundation system for other tower structures such as chimneys, stacks, distillation columns, telecommunication towers, and water towers.

Yet another object of the invention is to improve tower base bearing resistance in concrete pedestals supporting wind towers such that it becomes possible to build the pedestal and the foundation with concrete having the same compressive strength without increasing the diameter of the pedestal.

Another object of the invention is to build wind tower foundations in one continuous concrete pour.

Another object of the invention is to independently produce prefabricated components for offshore foundations to be assembled on a barge without having the critical path of completing a first component before a second component can be constructed.

Other objects, advantages and novel features of the present invention will become apparent from the following description of the preferred embodiments when considered in conjunction with the accompanying drawings.

BRIEF DESCRIPTION OF THE DRAWINGS

FIG. 17 is a partial plan view of a partially prefabricated foundation showing a general arrangement of lower radial post tensioning ducts in the rib inner zones and across the pedestal.

FIG. 18 is a partial plan view of a partially prefabricated foundation showing a general arrangement of upper radial post tensioning ducts in the rib inner zones and across the pedestal.

FIG. 19 is a partial plan view showing a general arrangement of radial post tensioning duct spacing in the pedestal.

FIG. 20 is a partial section view of a partially prefabricated foundation showing a general arrangement of upper and lower radial post tensioning ducts in the rib inner zones and across the pedestal.

FIG. 25$b$ is a diagram that shows cambers in the foundation of FIG. 25$a$.

FIG. 25$c$ is a diagram that shows a foundation cross section post tensioning, after a tower dead load and backfilling are added.

FIG. 25$d$ is a diagram that shows cambers in the foundation of FIG. 25$c$, after tower dead load and backfilling are added.

DETAILED DESCRIPTION OF THE PREFERRED EMBODIMENTS

Figure 1:
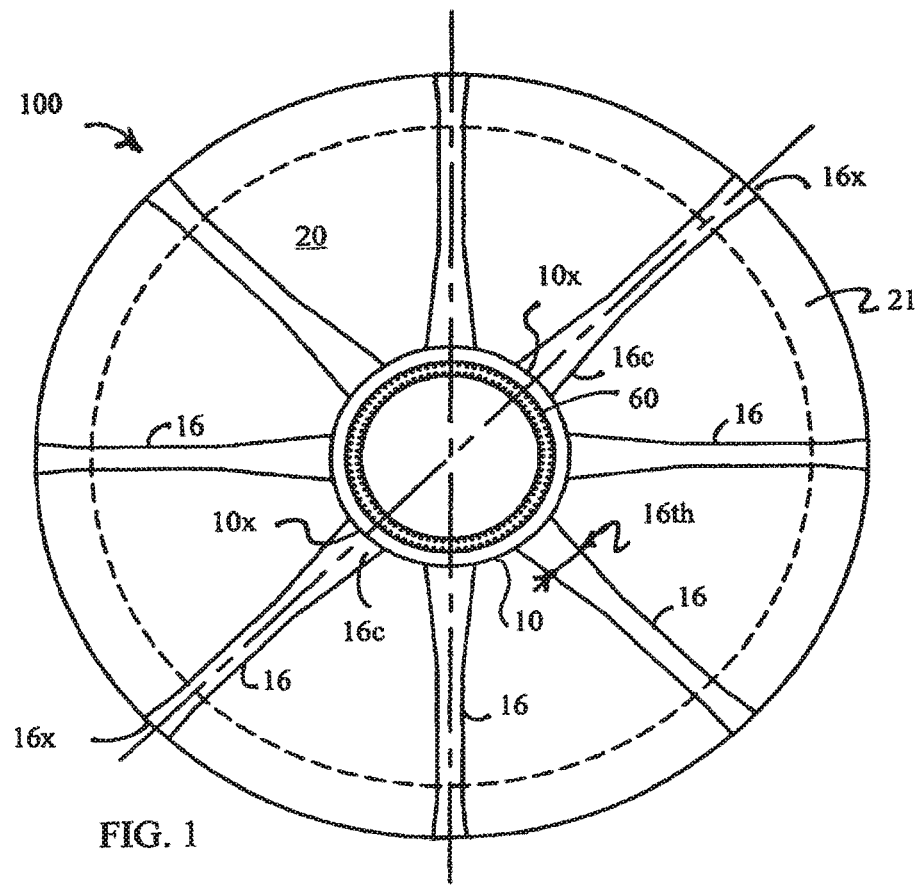
FIG. 1 is a plan view of the foundation.

The present invention pertains to a wind turbine foundation. The foundation comprises a plurality of components, namely a central vertical pedestal, a substantially horizontal bottom support slab, and a plurality of radial reinforcing ribs extending radially outwardly from the pedestal. The ribs may be prefabricated and transported to job site, but the pedestal and support slab are poured in situ at the site out of concrete. Alternatively the ribs may be cast in situ.

The present invention pertains to a fatigue resistant foundation 100 for wind towers which comprises a plurality of components, namely a central vertical pedestal 10, a substantially horizontal continuous bottom support slab 20 with a stiffened perimeter 21, a plurality of radial reinforcing ribs 16 extending radially outwardly from the pedestal 10 and a three-dimensional network of vertical 56, horizontal 110, 111, 112, diagonal 58b, 58c, radial 58 and circumferential 59 post-tensioning elements embedded in the footing that keeps all the structural elements under heavy multi-axial post compression, which reduces the stress amplitudes and deflections and allows the foundation 100 to have a desirable combination of high stiffness and superior fatigue resistance while improving heat dissipation conditions during construction by having a small ratio of concrete mass to surface area thus eliminating the risk of thermal cracking due to the heat of hydration.

A construction site is prepared by excavation, with flattening and preparation of soil for the foundation 100. The foundation 100 may be set on pilings 400, on piers 180, or have anchors 404 (soil anchors or rock anchors 404 or micro-piles 401 or other types) in a conventional manner.

The present invention ensures good contact between foundation 100 and soil, or sub-base 14a, by casting.

The foundation 100 is cast against prepared soil, a crushed stone sub-base 14a, a mud slab 14 or a membrane sheet in case of offshore foundations assembled on a barge or in dry docks. Known grouting and leveling techniques under precast elements can be employed for ensuring plumb installation and good soil contact.

In one embodiment of the invention, the foundation 100 may be set on a mud slab 14 or on compacted granular fill. The mud slab 14 is often a thin plain concrete layer intended to provide a clean and level base for the foundation installation. After the foundation site has been prepared, a plurality of three or more precast stiffener ribs 16 are placed on the mud slab 14 or compacted granular fill inside of the excavation pit 12. The precast concrete stiffener ribs 16 may have means for leveling or other leveling techniques can be employed for level and plumb installation. If desired, grouting techniques can be used to ensure complete rib base contact with the mud slab 14 or sub-base. The precast concrete ribs 16 may have bases 21 with left shear key 38 and/or shear connectors and right shear key 36 and/or shear connectors. The precast concrete stiffener ribs 16 may also have a vertical shear key 34. The shear keys 34, 36 and 38 and associated dowels 40, 42 and 46 are to ensure continuous connections, with complete transfer of shear and bending loads, between the precast concrete rib stiffener 16 and the cast in place concrete which is to be poured into the foundation 100 to form the bottom support slab 20. The precast concrete stiffener ribs 16 have upper dowels 40 and lower. dowels 42 extending on the right and left sides of the base 21 which interconnect with and spliced to upper mesh rebar 22 and lower mesh rebar 24 installed between the ribs 16 and connected to dowels 40, 42 to form reinforcement for the slab 20 and pedestal 10 of foundation 100 when the concrete is poured. The rib 16 has dowels 46 radially entering the pedestal 10 in the center of the foundation 100.

Doweling of rebar between the ribs 16 and foundation components can be achieved with rebar dowels extending from the prefabricated elements or by using rebar couplers, bar extenders or any mechanical rebar splicing system.

Arrays of grout or epoxy filled sleeves 42b arranged in the slab 20 could receive corresponding arrays of vertical dowels 42a extending from the bottom of prefabricated ribs 16 or perimeter beams 190 or other prefabricated components.

Shear keys, or shear transfer mechanisms, can be replaced with, or combined with, corbels or shear studs, or other shear connectors such as angled rebar or embedded steel shapes 34a.

In another embodiment an array of steel beams 16s, are encased into the web of the rib 16 and extend inwardly into the pedestal cavity at the inner most end of ribs, and serve as a suitable shear force transfer mechanism between the rib 16 and the pedestal 10.

In another embodiment, the foundation 100 comprises a steel frame 16f fully encased in concrete and has a central tower receiving a metal cylinder 56b fixed to an array of radially extending steel girders 16s encased in concrete beams 16, 21, 190 and rigidly connected at their outer ends to an array of perimeter beams 190 encased in the concrete foundation 100 and a reinforced concrete slab-on-grade 20 covering the foot print of the foundation 100 and connected to the steel frame.

In one embodiment the ribs 16 may be treated with concrete bonding agent along surfaces where cast in place concrete is received.

In another embodiment the foundation 100 may be provided with drains 23 around the perimeter and the top surface of the slab 20 is slightly sloped towards the drains 23 such that water is drained away from foundation 100.

In another embodiment, when foundations are installed in sites prone to seismic activities and elevated water tables, the slab may have holes to prevent soil liquefaction during seismic events.

In another embodiment the ribs 16 or other foundation elements may be covered or coated with protective material for extending the life span of the footing.

In another embodiment the ribs 16 are placed on the mud slab 14 first and then the pedestal cage 50 made of an array of rebar, preferably Z or C shaped rebar and circumferential rebar is assembled around anchor bolt assembly 60. Alternatively the pedestal cage 50 is assembled first or a preassembled pedestal cage 50 dropped into place first and then the ribs 16 with dowels 46 are slid into place so that dowels 46 and shear connectors 34, 34a fit between the elements of pedestal cage 50 rebar assembly.

The precast concrete stiffener rib 16 has lifting lugs 32 to help place the stiffener rib 16 into the excavated construction area. The base of the ribs may have a flat bottom surface such that the ribs may stand on their own on the mud slab 14 or compacted granular fill or during transportation from a precast plant to the foundation site. The precast concrete stiffener ribs 16 have prestressing elements 58 running through the ribs 16 radially from the outside of the ribs 16 and through pedestal 10. The radial prestressing elements 58 (or post tensioning elements) may be anchored to the opposite side of the pedestal 10 or optionally run through the opposing precast concrete stiffener rib 16 on the other side of the pedestal 10 and anchored at the end of the opposite rib 16. Once the ribs 16 and the pedestal cage 50 are in place, the dowels 46 extending radially inward from ribs 16 may be connected to, or spliced with, corresponding dowels arranged in the pedestal cage 50. Inside of pedestal cage 50 are additional rebar dowels 48 which will facilitate the continuity of the structural components through the pedestal 10 as well as resist bearing, shear and bending loads.

Also inside of pedestal reinforcement cage 50 is a bolt assembly 60 comprising a bolt template 52 an embedment ring 54 and anchor bolts 56 protected by a PVC sleeve 57 or wrapped with a material to prevent bonding between the anchor bolts 56 and concrete to be poured. The anchor bolts 56 have a top portion which is used to attach the base flange 301a of a tower or column to the pedestal 10. A grout trough template 52 at the bottom of the bolt template 52 may be used to create a grout trough 90 to ensure a good connection of the tower or column to the pedestal 10. The grout trough 90 will be formed by removing the bolt template 52 from the anchor bolts 56 after the concrete has been poured. Radial dowels 46, prestressing elements 58 or shear connectors 34 at the inner end 16c of ribs 16 should be spaced to clear anchor bolts 56 and other reinforcement arranged in pedestal cage 50.

In a preferred embodiment, for fully cast in place foundations, slab forms 17 may sit directly on the mud slab and rib forms 16b are supported and kept elevated above slab 20 elevation by means of adjustable and reusable support legs 16y arranged in the rib forms 16b. Small footings or thickened mud slab areas could be used under rib 16 form support legs. Pedestal forms 102 can be supported by rib forms 16b or by separate support legs.

When ribs 16 are prefabricated, the bolt assembly 60 is held in place and the anchor bolts 56 are can be properly oriented by an alignment apparatus 130. The alignment apparatus 130 has a central post 132 with arms 134 attached perpendicularly to the center post 132 and having legs 136 for attachment to the top of the ribs 16 to provide added stability and proper bolt template 52 alignment during construction. The legs 136 have an adjustable height relative to the arms 134. The arms 134 may have braces 138 attached to the central post 132 for holding the arms 134 straight. The central post 132 may also have central post support 135 to support the central post 132. The alignment apparatus 130 also has adjustable support members 140 for attachment between the arms 134 and the bolt template 52 to align the anchor bolts 56 so they are upright. The alignment apparatus 130 can support the bolt assembly 60 without the central post 132 by relying on the legs 136 supported by ribs 16, which allows the lower portion of the central post 132 to be removed if desired, Alignment apparatus 130 can be used as a template to ensure proper location, elevation and orientation of ribs 16.

Figure 49:
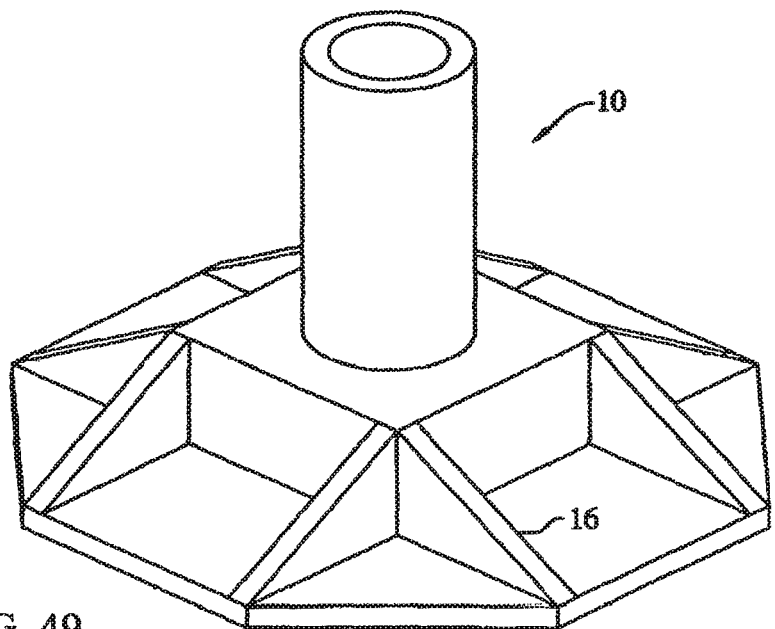
FIG. 49 is a perspective view of a foundation in with a concrete stem extending above the foundation. The vertically prestressed stem is made with prefabricated concrete segments or cast in place concrete. This configuration is suitable for offshore wind towers or hybrid concrete steel wind towers. The pedestal has a solid core and the stem has a hollow core that can be filled with ballast at the offshore installation site.
Figure 50:
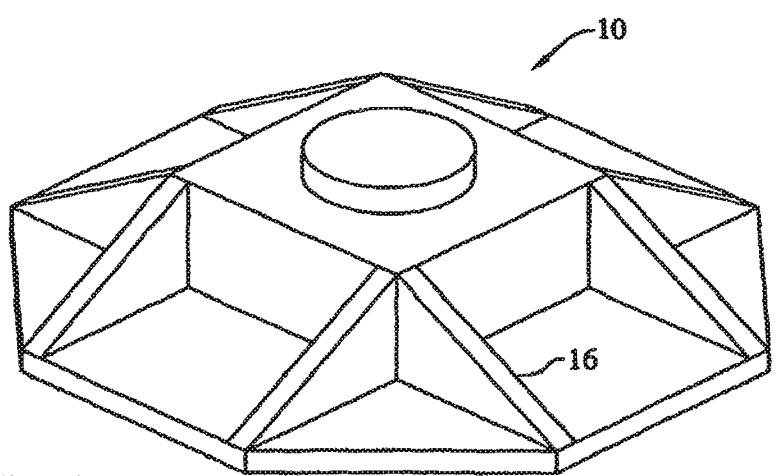
FIG. 50 is a perspective view of a foundation.
Figure 51:
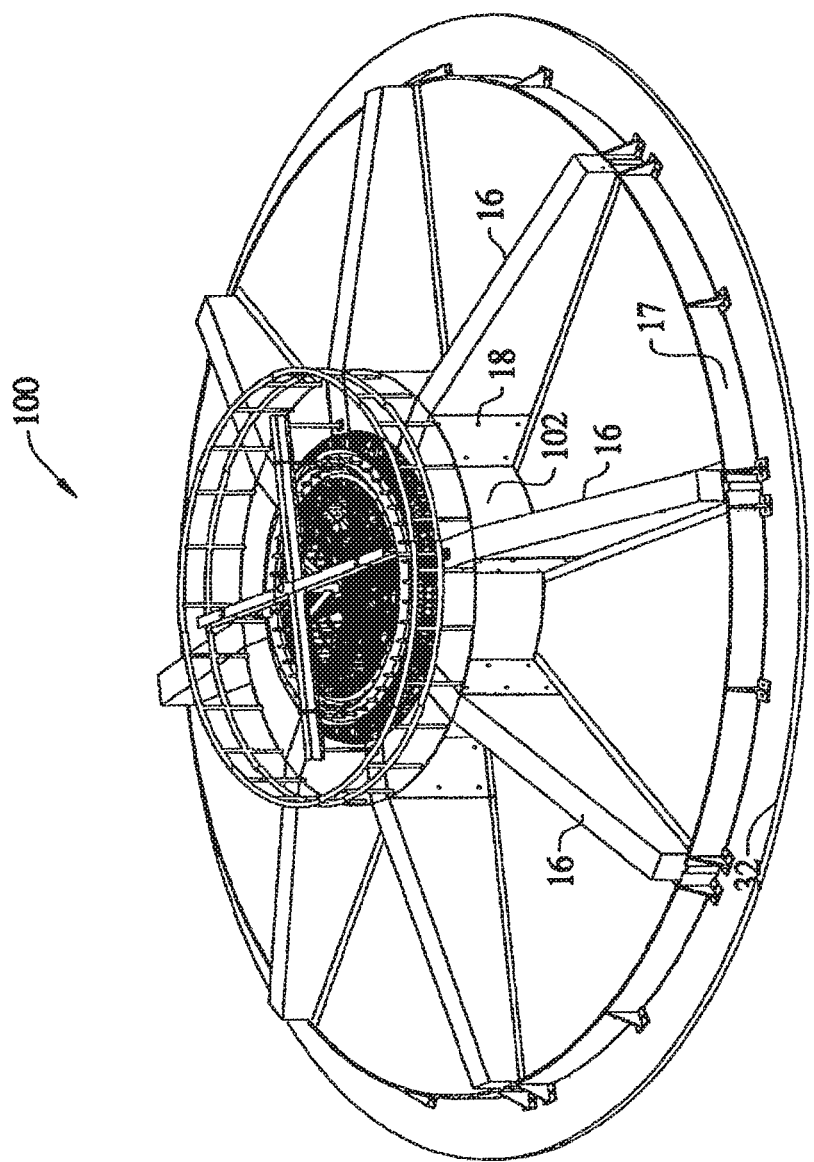
FIG. 51 is a perspective view of the foundation during construction with slab concrete in place and the pedestal ready for a concrete pour
Figures 52, 52A:
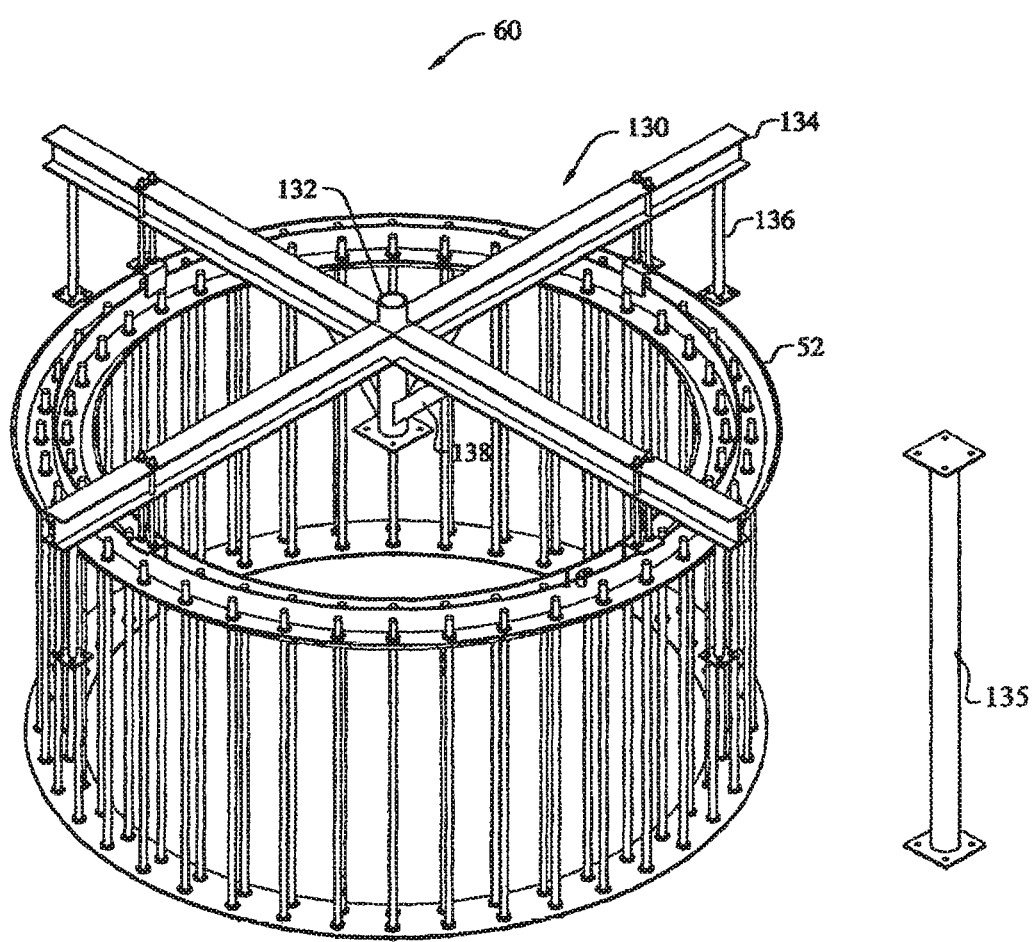
FIG. 52 is a perspective view of the bolt assembly and alignment apparatus.
FIG. 52a is the rod support for the bolt assembly and alignment apparatus.
Figure 53:
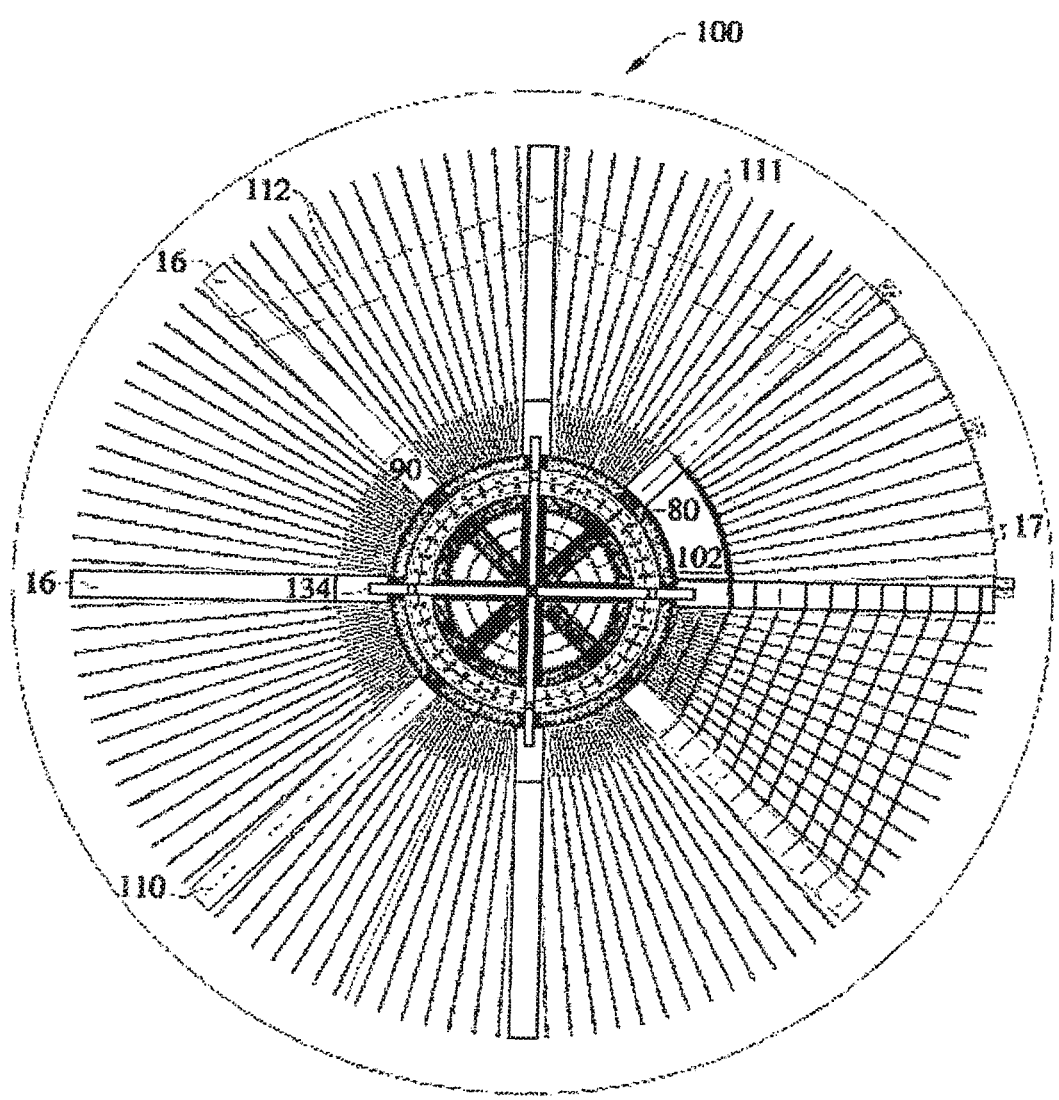
FIG. 53 is a plan view of the foundation showing different groups of reinforcing and post-tensioning elements in the slab.
Figure 54:
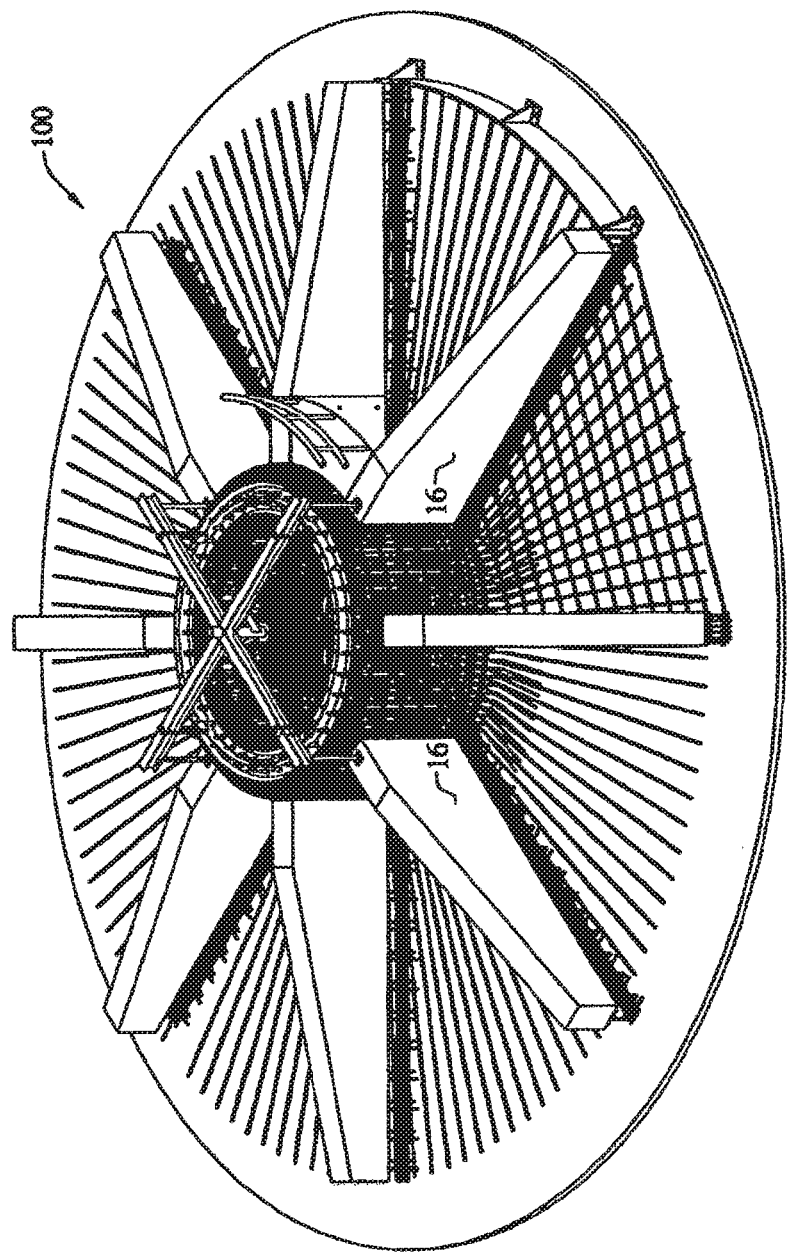
FIG. 54 is a perspective view of a prefabricated rib and forms for forming the pedestal and slab.
Figure 55:
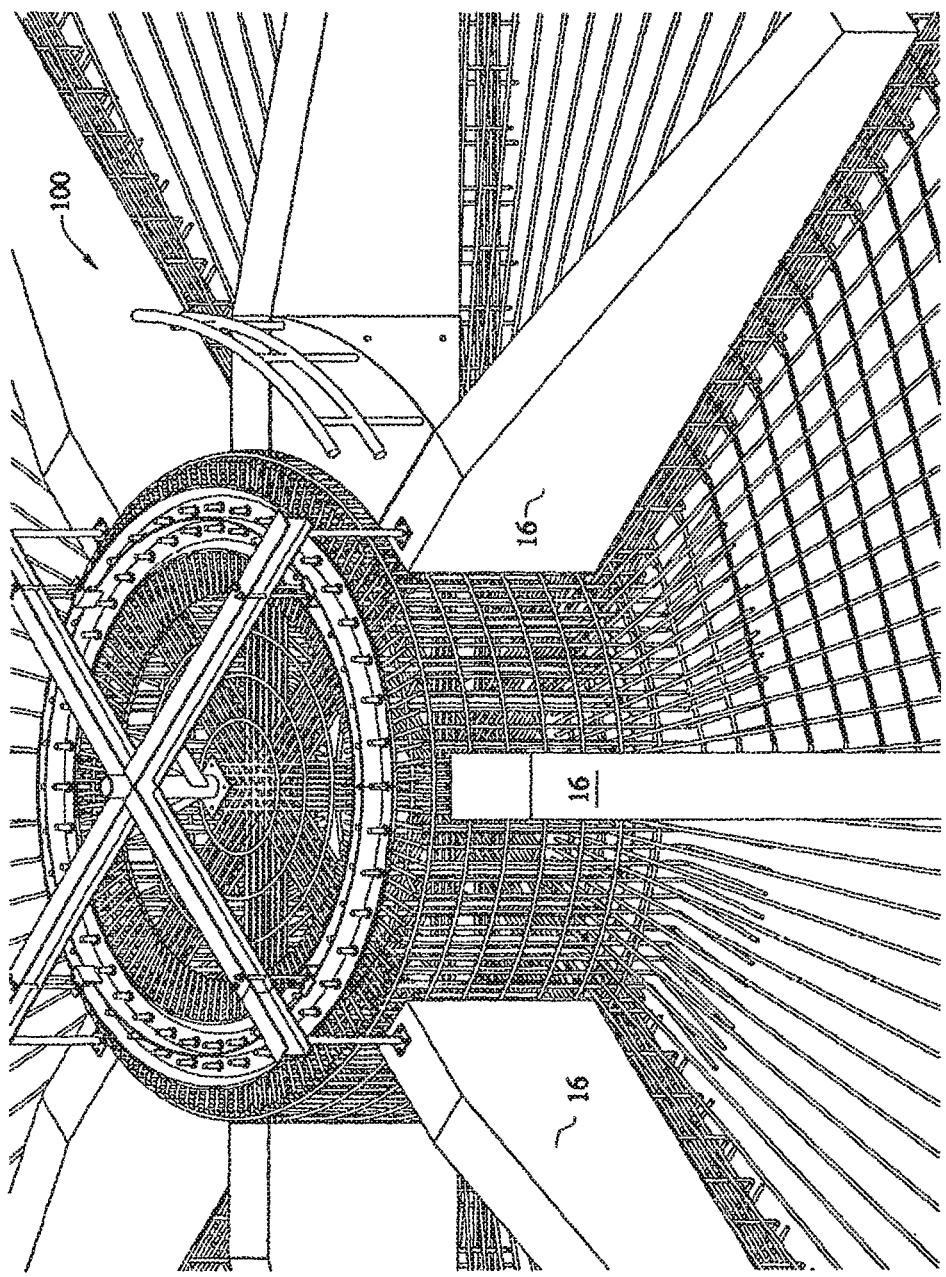
FIG. 55 is an inner perspective view of a prefabricated rib showing rib dowels and connections to the pedestal and the slab.
Figure 56:
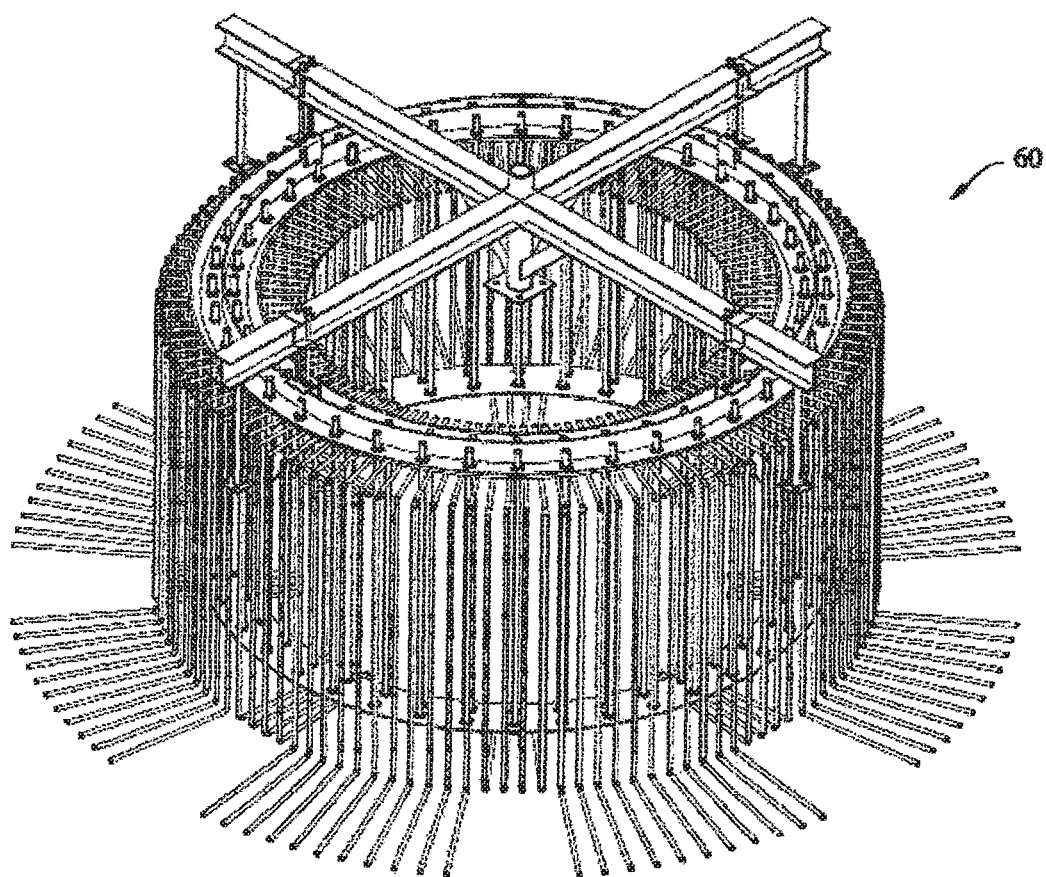
FIG. 56 is a perspective view of the pedestal cage assembly with anchor bolts and reinforcing cages around the anchor bolt assembly.
Figure 57:
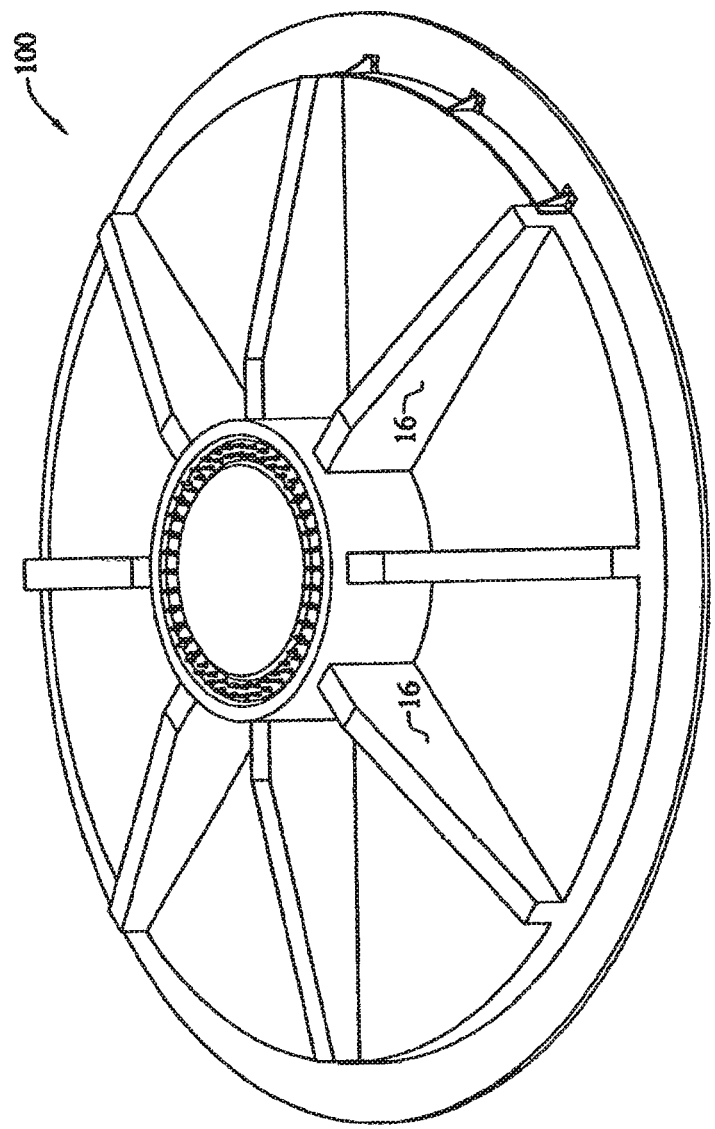
FIG. 57 is a perspective view of a completed foundation.

The ribs 16 can be of any shape or size depending on the specifications of the tower and loads thereon. For example, the cross-section of the ribs 16 may be trapezoidal, rectangular, T shaped or I beam shaped. The ribs 16 may be triangular prisms as shown in FIGS. 49 and 50. The ribs 16 may have intermediate stiffener plates or diaphragms for improved structural performance. The ribs 16 or rib forms 16b may receive ramps or catwalks thereon for easy access to the forms during construction.

Ribs 16, or rib forms 16b, may have means for receiving and supporting perimeter forms 18, such as bolts or threaded inserts for receiving and supporting the pedestal forms 102. The ribs 16, or rib forms 16b, may also have attachment means 15 for holding base forms 17. The pedestal forms 102 may be equipped with platform sections for allowing access around the pedestal and the rest of the footing.

With all the rebar 22, 24, ribs 16, pedestal 10, bolt assembly frame 80 and optional alignment apparatus 130 in place concrete forms may be attached such that concrete can be poured to form the pedestal 10 and slab 20 of the foundation 100. Pedestal forms 102 may attach to the ribs 16, or rib forms 16b, by bolts 18 or by any other means. Similarly, the base perimeter forms 17 may be attached to the ribs 16, or rib forms 16b, by bolts 15 or by any other means. Alternatively, the base perimeter forms 17 may be supported to the ground or the mud slab.

With all the parts assembled all the rebar in place and the duct for the prestressing tendons, or prestressing elements of the foundation in place, concrete is then poured into the pedestal 10 and between the ribs 16. The pouring of the concrete can be accomplished quickly and the slab areas between the ribs 16 can be finished as the pedestal 10 concrete is still being poured. The concrete may be used to build the pedestal 10 and the slab 20 in one pour. Alternatively, the base for the entire slab 20 foot print of the footing can be poured in a first pour then the pedestal 10 can be formed in a second pour.

When a bonded multi-strand post tensioning system is used in the foundation 100, the prefabricated components are fitted with ducts and anchor hardware according to design specifications. The cast in place components will be fitted with matching ducts to facilitate the continuity of tendons across the foundation 100. After the jacking of tendons, duct grouting is carried out as required. If the un-bonded, bundled mono-strand system is employed, no duct or grouting is required.

The structural load capacity of the foundation 100 is increased significantly by the combination of radial 58 (or diametric) and circumferential post tensioning 59. Circumferential post tensioning 59 creates a desirable symmetric bi-axial post compression in the slab 20. Circumferential post tensioning 59 is applied at an elevation well below the neutral axes 16n of the ribs 16 thus creating eccentric post compression in the ribs 16 and the pedestal 10 and resulting in increased nominal moment and shear capacity of the ribs 16 as well as improvement in multi-axial fatigue resistant of the pedestal 10, ribs 16 and the slab 20. Radial or diametric post tensioning elements 58 extend from rib 16 to opposite rib 16 across the pedestal 10. Radial post-tensioning is applied with an eccentric load pattern, with higher. post compression below the neutral axis 16n of the rib 16. When all the prestressing elements are jacked, the foundation 100 is kept under heavy multi-axial eccentric post compression stress, thus increasing rib 16 structural capacity to resist soil support reaction and providing low deflections, high stiffness and low stress amplitudes resulting in high fatigue resistance and high durability of the slab 20. Backfill 13 is added over the slab 20 for increased stability and stiffness of the foundation 100.

After the concrete sets, post tensioning is carried out and the foundation 100 is backfilled with compacted granular fill 13 to stabilize the foundation 100 against overturning.

Alternately, the bolt assembly 60 can be replaced by a tower section 56b embedded in pedestal 10 concrete. The embedded section 56b having means 56c for receiving a tower base 301 by means of a bolted connection arranged at the top of the section 56b The embedded metal cylindrical tower section 56b encased in pedestal 10 concrete is provided with holes 56h for rebar and post tensioning tendons 58 to extend through the metal cylinder 56b. Post tensioning 58 tendons can extend through holes 56h arranged in the cylinder and across the pedestal 10, through the ribs 16 to be anchored on distal ends of the foundation.

Pedestal 10 can be any size or shape, round, triangular, square, polygon or other shape depending on the specifications of the tower and loads thereon. The ribs 16 can be in any pattern around the pedestal 10. In one embodiment shown in FIGS. 49, 50 the foundation 100 may have a square pedestal 10 and ribs 16 at the corners parallel to the faces of the pedestal. The pedestal 10 may have a stepped construction with an enlarged lower cross section to reduce the length of the cantilevered ribs 16.

Pre-assembled reinforcement sections (meshes) of the slab 20 components can be lowered into place in the slab 20 to speedup construction. All rebar dowel or metal shear connectors extending through construction joints may be galvanized or Epoxy coated to prevent corrosion. The use of mechanical couplers in the foundation 100 may be limited or avoided. Specified mechanical couplers must be tested and certified for the number of load cycles in the life span of the foundation 100.

In another preferred embodiment, the ribs 16 are cast in place in reusable rib forms 16b. The ribs 16 are cast in place jointly with the pedestal 10 in one continuous pour over the slab 20. Optionally, the ribs 16, the pedestal 10 and the slab 20 are all jointly cast in one pour. All rib internal components including rebar assembly with dowels and prestressing elements are placed inside the forms, then cast in place concrete is poured into the rib forms 16b as well as into pedestal 10 and slab 20 forms.

Rib reinforcing cages 16rc can be assembled above grade and lowered into the foundation in one or more sections.

In a preferred embodiment, rib forms 16b with internal rib reinforcing cages 16rc are preassembled and lowered into the foundation by cranes to mesh with slab reinforcing sections 22, 24 already placed in the foundation. The radial reinforcing pattern 22 of the slab 20 enables the meshing rib dowels 42 between slab reinforcing 22, 24 without geometric interference.

Ribs 16 can also be made in segments 16sg and eventually united by means of doweling or by using segmented post-tensioned construction techniques. Rib anchor zone 16x with anchor trumpets 16t and hardware can be prefabricated separately of higher strength concrete than the rest of the rib 16.

Figures 34, 35:
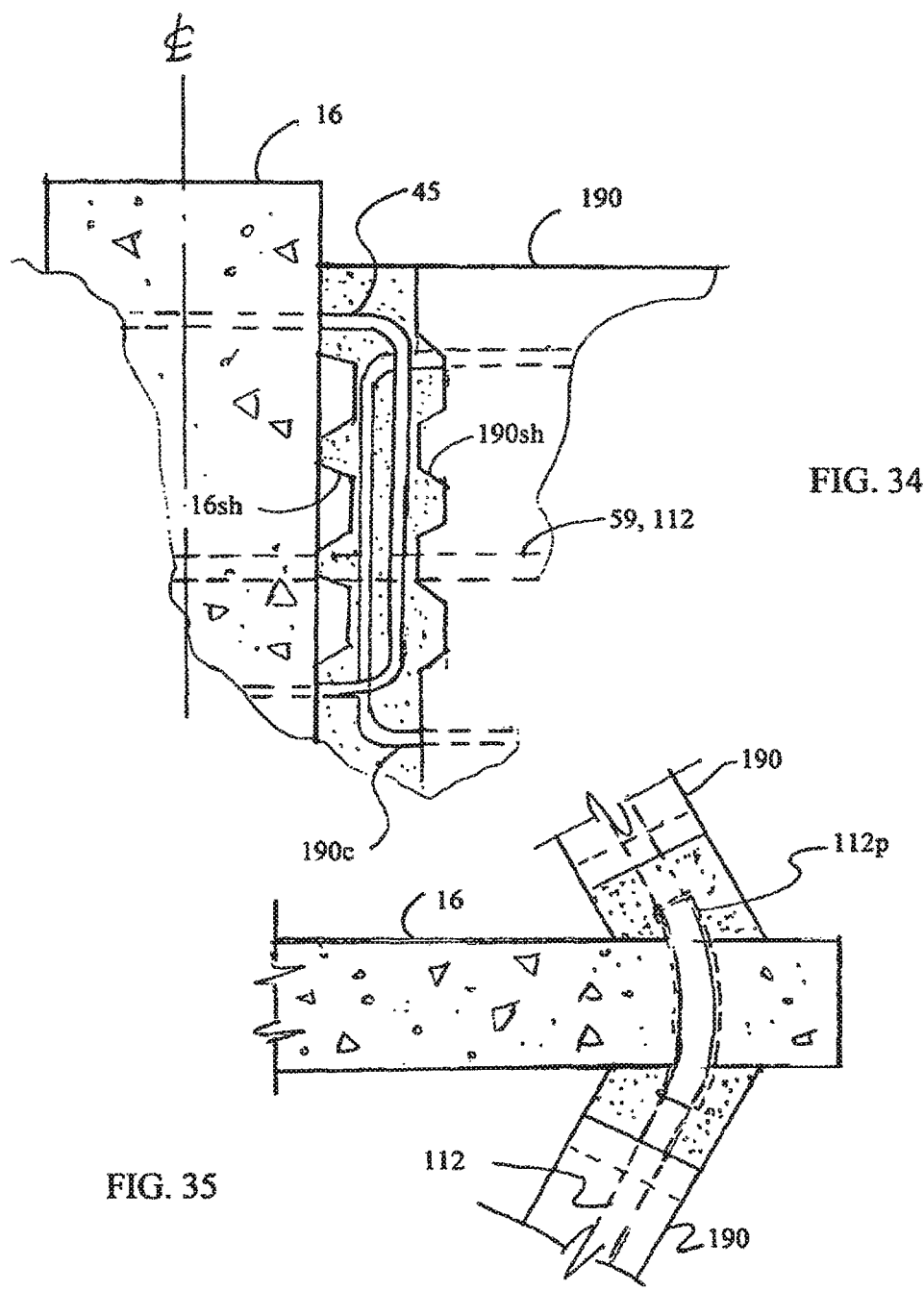
FIG. 34 is a detail that shows a side view of a prefabricated rib to a prefabricated perimeter beam connection.
FIG. 35 is a detail that shows a top view of a prefabricated rib to a prefabricated perimeter beam connection.
Figure 47:
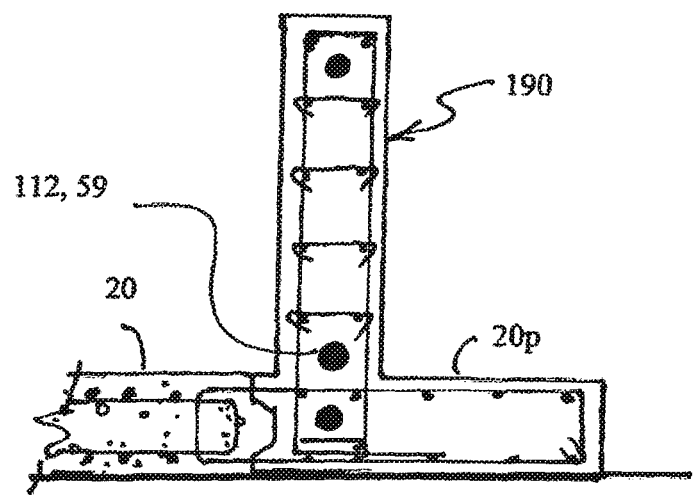
FIG. 47 is a connection detail of an L-shaped, prefabricated perimeter beam to a cast-in-situ slab.

As shown in FIGS. 35 and 47, prefabricated perimeter beams 190 with post tension ducts 112 may serve as perimeter forms and become part of the structure. An array of precast, rectangular or L-shaped beams 190 with means for connecting to the slab 20 and the ribs 16 can be used in the foundation perimeter construction. The perimeter (edge) beams 190 can rest directly on the mud slab and connect to the slab 20 using horizontal dowels and shear keys arranged on the inner side. Optionally the perimeter beam 190 is elevated and connects to the top of the slab 20 using dowels 190b extending from the bottom of the perimeter beams 190 The precast perimeter beams 190 may have dowels 190b and shear keys 192 (such as corrugations) extending from their sides ends for connecting to the ribs 16. In this case the ribs 16 will have corresponding dowels 45 and shear keys 16sh for receiving and supporting perimeter beams 190. The connection between ribs 16 and perimeter beams 190 is established using closure pours in small cavities at the conjunctions of the ribs 16 and the perimeter beams 190.

The foundation 100 pertains to a hybrid gravity based and rock anchored foundation. Ribs 16 can be made with arrangement, mechanisms and connectors for receiving piles 400 or micro-piles 401 or anchors 404 in different configurations. Vertical through holes 16g in the ribs 16 can provide means for receiving a pile 400, micro pile 401 or an anchor 404. Bearing elements 404b and grouting are arranged on top of each rib 16 to establish the required structural connection. An array of bearing plates 404b with tensioning nuts 404c on each soil/rock anchor may be used to compress the foundation 100 against supporting soil. Vertical through holes 16g with corrugations 404h for the anchor 404 extend through the foundation 100. Bearing plates 404b with tensioning nuts 404c can be placed on top of the pedestal 10 or in the foundation 100. If desired ribs 16 may have piers 180 extending vertically from the ribs 16 and the top of the pier elevation is raised to a higher elevation to make anchor bolts 404a accessible for tensioning and testing. Typical rock or soil anchor construction and pouting methods can be utilized. Another option is to house rock anchor bolts 404a and hearing plates 404b and tensioning nuts 404c in accessible corrosion protection compartments above the foundation 100.

Figure 43:
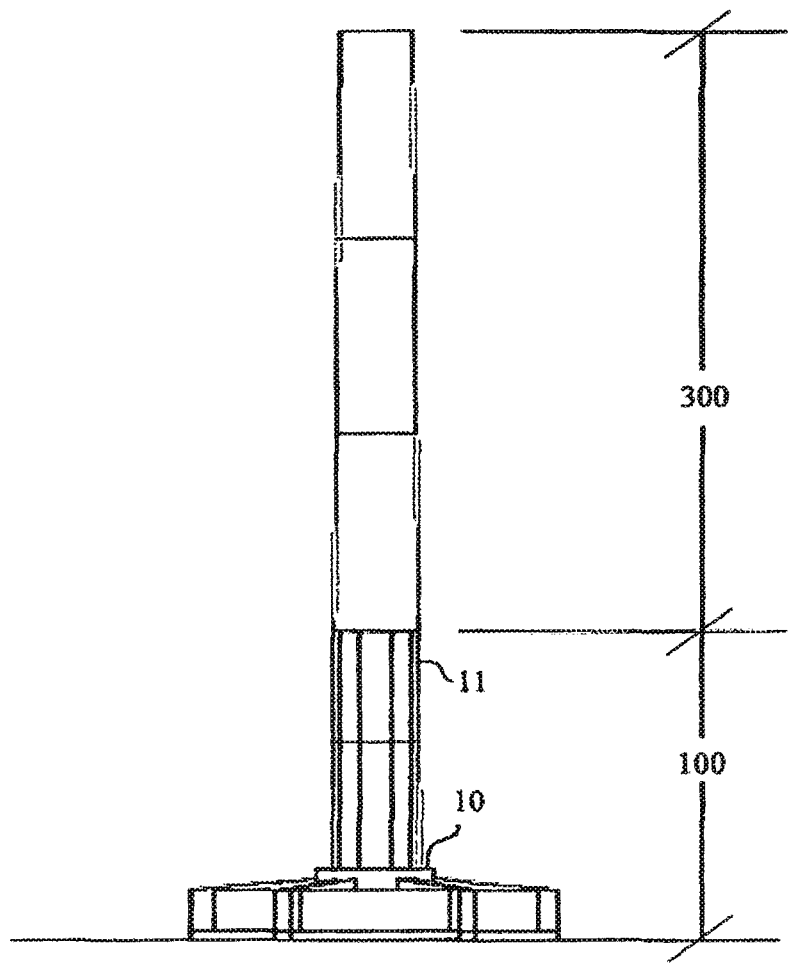
FIG. 43 is an elevation view of a foundation with a prefabricated segmented concrete stem. The foundation is supported by micro-piles or anchors.
Figure 44:
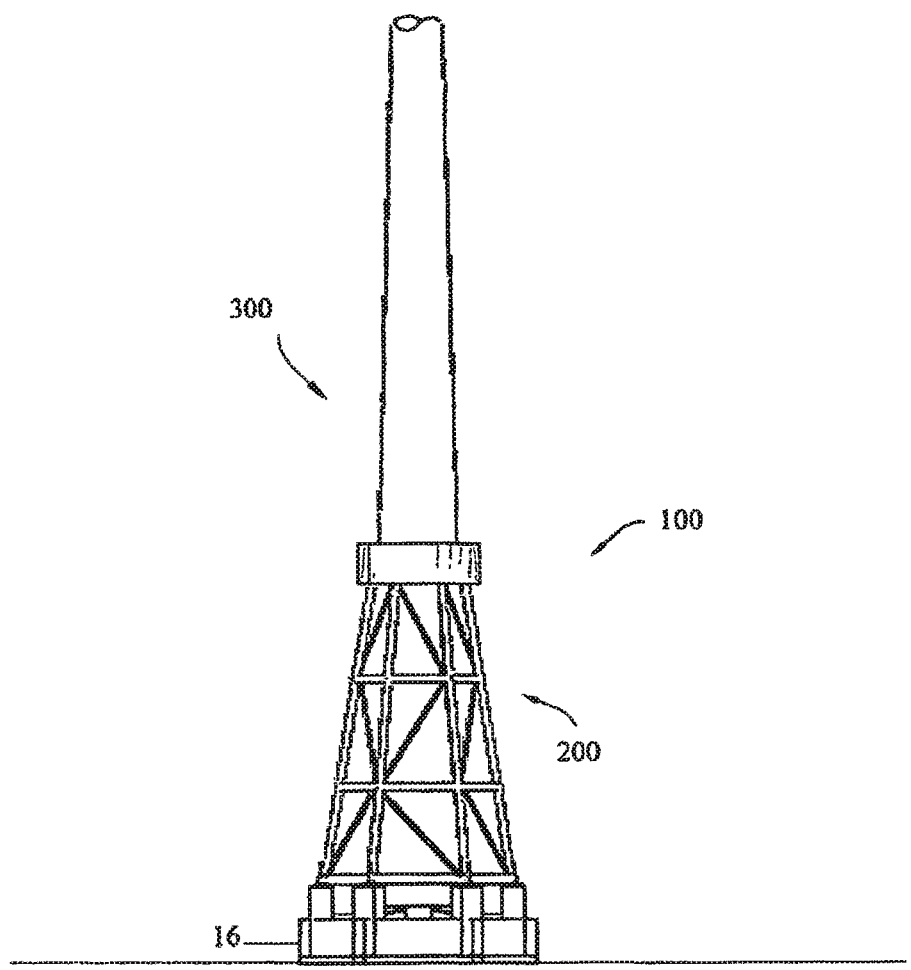
FIG. 44 is a perspective view of the foundation comprising a prestressed concrete base and a lattice steel tower with a wind tower receiving adaptor at the top.

In another embodiment as shown in FIG. 43 and FIG. 44, the invention pertains to a foundation 100 that comprises the following elements: 1 A vertically extending pedestal 10 that is cast in situ, out of concrete, the pedestal 10 serving to receive and support the tower structure; 2 A substantially horizontal support slab 20 that is cast in situ out of concrete, the support slab 20 covering an area of ground larger than that covered by the pedestal 10; 3 A plurality of radial ribs 16 extending radially outwardly from the pedestal 10 and spaced around the pedestal 10, each rib being joined along the base thereof to the support slab 20 and being joined along an inner side thereof to the pedestal 10, each rib has means for receiving a rock or soil anchor; 4 An optional plurality of perimeter beams 190, or stiffened slab edge 21, spanning continuously, near the perimeter of the foundation 100p, between ribs 16 and supporting the slab 20 may be employed; 5 An array of soil or rock anchors 404 extending through the foundation 100, preferably through the ribs 16, may extend down into the ground below the foundation, each anchor having a bearing element 404b in or above the foundation 100 and compressing the foundation against support soil when the anchors are tensioned, 6 Optionally the anchor can be grouted into the ground to function as a pile anchor.

The prefabricated components can be molded at a facility under controlled conditions for good quality concrete setting and controlled rebar spacing which is superior to what can be obtained on a job site and at a lower cost. The ribs 16, acting as deep stiff horizontal cantilever support, allow the base of the foundation slabs to have a relatively small thickness using less cast in place concrete and rebar thus lowering the cost for each foundation.

Figure 36:
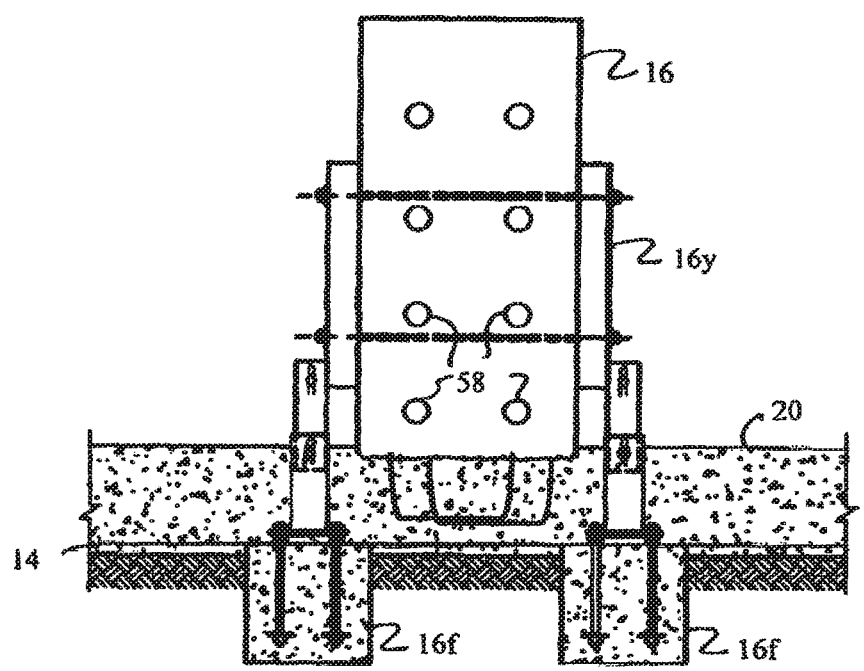
FIG. 36 is detail that shows a rib being temporary supported by a set of rib supports with through bolts extending through holes in the ribs and removable and reusable assembly that connects to a lower supports on sub-footings. Cotter pins are used to secure the top assembly to the bottom support.

Alternatively, as shown in FIG. 36 ribs 16 may have reusable temporary supports 16y, or other means, arranged at the ribs 16 to hold the ribs 16 in place, maintain them plumb during construction and elevate them at a predetermined height over slab reinforcing 22, 24. This style of ribs 16 is intended to be raised above the ground or mud slab 14 so that the foundation support slab 20 can be poured in place continuously under ribs 16. Dowels 42 and shear connectors for this style may be arranged at the bottom of the rib 16 for connecting with base slab 20 which extends under the raised rib 16. When the concrete cures the continuous support slab 20, extending under the ribs, is united to the prefabricated ribs 16 and the ribs 16 are also united to the pedestal 10. The rib inner ends 16c will be partially encased in the pedestal 10 to increase rib torsional end resistance. The final result is a continuous monolithic foundation wherein loads are carried across the structure vertically and laterally through the continuous structure by the doweled and spliced reinforcing steel bars which are integrally cast into the pedestal 10, ribs 16 and support slab 20. The combination of the high stiffness of the ribs 16, solid pedestal 10 and continuous slab 20 construction across the pedestal 10, and under ribs 16, allows the slab 20 to behave structurally as a continuous slab 20 over multiple rigid supports resulting in small flexural and shear stresses in the slab 20, reducing deflections, improving fatigue conditions and increasing the stiffness of the foundation as well as allowing for the benefits of an economical design.

Cast in situ concrete can be shielded from extreme weather, including heat, cold, rain and snow, by simply extending blankets, covers or shields between ribs 16 during construction, and then using heaters or fans as required to regulate the temperature and humidity of the concrete to allow for proper setting and curing conditions.

Another embodiment of the present invention pertains to a leveling technique that simplifies the tower base leveling process and shortens the number of steps required for grouting under a tower base. The bolt template 52 is provided at the very top of the bolt assembly 60 with at least three sets of additional bolts 53 and corresponding threaded bolt inserts 53h suitable for embedment in the concrete. Such leveling bolts 53 and inserts 53b will be located outside or inside the bolt circle 60a of tower base, but directly under tower base flange 301a. This allows for continuity of grout bed 90a construction and provides an easy access to leveling bolts 53. Small cutouts at leveling bolt locations may be used. Another benefit of this leveling technique is having the ability to apply continuous grout bed 90a that is free of cold joints, under the tower base flange 301a in one session as well as having the ability to tension all anchor bolts 56 in one work session.

In another embodiment the onshore foundation may have a pedestal 10 that is rigidly connected to vertical concrete stem 11 that is fixed to a tower base of a wind tower. The pedestal and the stem are vertically prestressed with vertical post tensioning elements extending through the height of the foundation. The stem is fitted with an array of bolts 60 for receiving and supporting the tower base 301.

The foundation design, as shown in FIG. 44, can be reconfigured to support lattice towers 200 comprising multiple columns connections to foundations in a spaced array. The ribs 16 will be provided with column receiving components including embedded anchor bolts (or grouting around an embedded element) and an integral pier design into the rib 16. The rib geometry may be widened and enlarged at the integral pier 180. The array of said integrated piers ribs 16 are fitted with means for receiving and supporting the legs or the columns 200a of the lattice tower 200.

The integral piers 180 can extend above final grade elevation, while the top of pedestal 10 may stay below final grade elevation. For this foundation style, pedestal elevation may be depressed and tower receiving components may not be required in the pedestal 10. This configuration may also be used in offshore applications wherein a prefabricated gravity foundation 100 is connected to lattice tower structure 200 that is fitted with a wind tower receiving component at its top. The foundation 100 will be installed over prepared seabed and filled with a suitable backfilling material 13, and surrounded with scour protection 13b.

Figure 45:
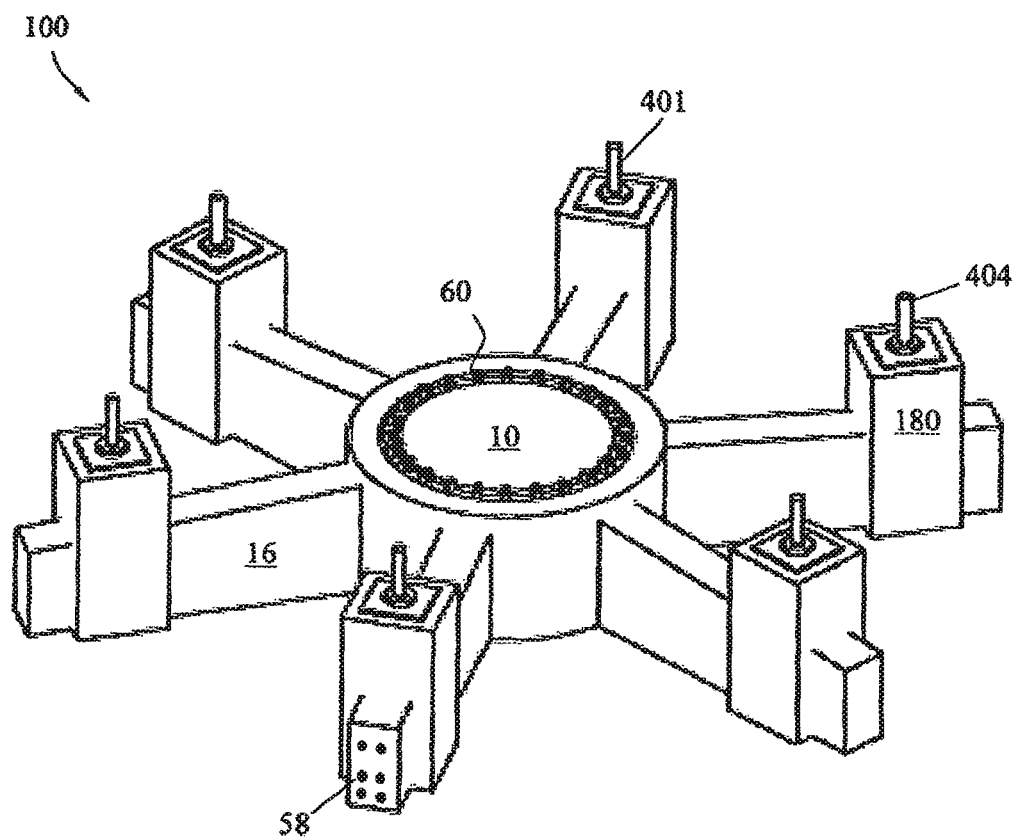
FIG. 45 is a perspective view of the foundation.

As shown in FIG. 45, in permafrost conditions, the foundation 100 may be supported on an array of concrete piers deeply embedded and frozen into the ground. Anchor bolts 404a can be used to secure the ribs 16 to their supporting piers 402 around the perimeter of the foundation 100p. The slab 20 bottom elevation set above grade elevation. Alternatively, the slab may not be used in the design.

In another embodiment as shown in FIG. 1, the invention pertains to a fatigue resistant gravity based spread footing for use under heavy multi-axial cyclical loading of a wind tower 300 which comprises a plurality of components, namely a central vertical pedestal 10, a substantially horizontal continuous bottom support slab 20 with stiffened perimeter 21, a plurality of radial reinforcing ribs 16 extending radially outwardly from the pedestal 10 and a three-dimensional network of vertical 60, horizontal 110, 111, 112, 58, diagonal 58b, 58c, radial 58 (or diametric) and circumferential 59 post-tensioning elements that keep the structural elements under heavy multi-axial post compression with specific eccentricities and orientations that are intended to reduces stress amplitudes and deflections and allows the foundation 100 to have a desirable combination of high stiffness and superior fatigue resistance while improving heat dissipation conditions during construction by having a small ratio of concrete mass to surface area thus eliminating the risk of thermal cracking due to heat of hydration.

Vertical prestressing of the pedestal 10 can be carried out independently of tower receiving elements. A pedestal 10 may have an array of vertical post tensioning elements 56 that does not connect to a tower 300, and an embedded tower section 56b bolted to a tower structure 300.

Radial post-tensioning 58, extending across the foundation 100, in pairs of ribs 16, allows for the desirable structural continuity and the direct transfer of loads from downwind ribs 16 into the pedestal 10 and then into the opposing upwind ribs 16. Radial and circumferential post compression stresses in the slab 20 and/or perimeter beams 190 allows for a desirable reduction in stress amplitudes the structural continuity between slab 20 spans and/or perimeter beam 190 spans, across the ribs 16, thus creating a desirable load sharing mechanism between adjacent ribs 16 by forcing more ribs 16 to be engaged in resisting tower loads.

The invention pertains to a durable, high-stiffness, fatigue-resistant foundation structure 100 for onshore wind tower installations which comprises: 1. a central pedestal 10 that is made of cast-in-place concrete with concentric vertical prestressing elements 56, 70 and eccentric multi-axial horizontal and/or radial post-tensioning elements 58a, 58b, 58c; 2. an array of cast-in-place eccentrically post-tensioned radial ribs 16; 3. a cast-in-place slab 20 with heavily post-tensioned thickened slab edge 21.

All components are made of high strength reinforced concrete and are rigidly connected to each other to behave as a monolithic spread foundation structure. The structural components are rigidly connected with arrays of rebar dowels 42, 46 (passive reinforcing) and/or post-tensioning elements extending through the conjunctions. The slab 20 functions as a two-way slab system that is free of construction joints across the footprint of the foundation and spans continuously over multiple ribs 16. Perimeter post tensioning 59a or circumferential post tensioning 59 of the slab 20 is applied at an elevation well below the neutral axes 16n of the ribs 16 to cause eccentric loading of the ribs 16 and the pedestal 10. Radial post-tensioning elements 58 with an eccentric load pattern, with higher post compression at the bottom of the rib, extend from rib end 16x to the opposite rib end 16x across the pedestal 10, or to the opposite end of the pedestal 10. When all the prestressing elements are jacked, the foundation 100 is kept under heavy multi-axial eccentric post compression stress, thus increasing rib 16 structural capacity to resist soil support reaction and providing low deflections, high stiffness and low stress amplitudes resulting in high fatigue resistant and high durability. Backfill 13 is added over the slab 20 for increased stability and stiffness of the foundation 100.

Soil support reaction under the slab 20 is transferred from the slab 20 to the ribs 16 and thickened slab edge 21 (or perimeter beams 190) as in two-way slab systems with more load distribution going to the ribs 16 in the primary span. Perimeter 112 or circumferential 59 post-tensioning is applied, generally in the orientation of the primary span that effectively reduces stress amplitudes and deflections in the slab 20 by keeping the slab 20 under heavy post-compression in the directions of primary slab spans 20s1, and secondary slab span 20s2 around the foundation. The size, distribution, eccentricity and location of post tensioning elements 58 in the ribs 16 and the slab 20 are used to dictate the natural frequencies of the foundation 100 to be in a safe range relative to operating frequencies of the wind generator according to turbine manufacturer recommendations.

The 3-dimensional post-tensioning network in the foundation keep all the structural components (Pedestal 10, ribs 16, slab 20, thickened slab edges 21 (or integral edge beams)) under multi-axial post compression confinement resulting in lower stress range amplitudes thus yielding higher stiffness, more effective crack control, lower deflections and improved fatigue resistance. Superior fatigue resistance and long lifespan are achieved by keeping most of the structural elements of the foundation 100 under multi-axial compression while resisting operating loads or even during normal and abnormal extreme loads from the supported structure (wind power generator).

In a preferred embodiment, rib post-tensioning requirements are reduced by engaging fully developed bar dowels 46 from the rib 16 into the pedestal connection as well as extending fully developed radial rebar dowels 22r, 24r of the slab 20 into the pedestal 10, thus allowing passive reinforcing to participate in the connection especially under extreme loads. A radial slab reinforcing pattern with tapered rib width is very cost effective as the rib 16 to pedestal 10 connection benefits from a large number of top and bottom radial slab reinforcing bars 22, 24 participating in said connection, as the rib width widens, thus reducing the number of bottom post-tensioning strands 58a required for the connection.

The structural configuration of the foundation 100 reduces the overall cumulative deflections in the structure under tower loads and significantly improves the rotational stiffness of the foundation 100 which is a key factor in determining the size of foundations in wind turbine installations. The rotational stiffness is also improved by the interlocking between the surrounding soil (after backfilling) and the multiple surfaces and vertical faces of the foundation structure. The horizontal stiffness is improved by the passive earth pressure on the multiple surfaces of the structure. Both rotational and horizontal stiffness achieved by this design are much higher than conventional tapered inverted-T gravity spread footings especially for onshore foundations installed below grade in an excavated pit because of the increased interlocking surface area and increased passive earth pressure and increased friction on the multiple faces of the fatigue resistant foundation 100.

The solid-core pedestal 10 comprises a continuous reinforcing cage 50 and a tower receiving component 56, such as anchor-bolt assembly 60, with a cylindrical array of bond protected high strength post-tensioning bolts 56, for connecting to wind tower base flange 301a. In another embodiment and the tower receiving component may comprise an embedded cylindrical metal tower section 56b with means 56c for connecting to a tower section such as a flange 56c with bolt holes 56d for receiving bolts 301b at its top and with an array of holes 56h to allow the passing of rebar 46 and post tension tendons 58. The embedded tower section 56b is also fitted with conventional bearing flanges 56e and ring stiffeners for interlocking with the pedestal concrete. The anchor bolt assembly 60 ensures structural continuity between the tower 300 and the pedestal 10. The post-tensioning forces of the anchor bolts 56 are selected to insure that the tower base flange 301a remains in contact with the pedestal 10 under extreme normal and abnormal load conditions. The bolt assembly 60 includes, at its bottom end, a bearing element 54 that may consist of an embedment ring plate 54 that is made of segments that are welded together.

Figure 7:
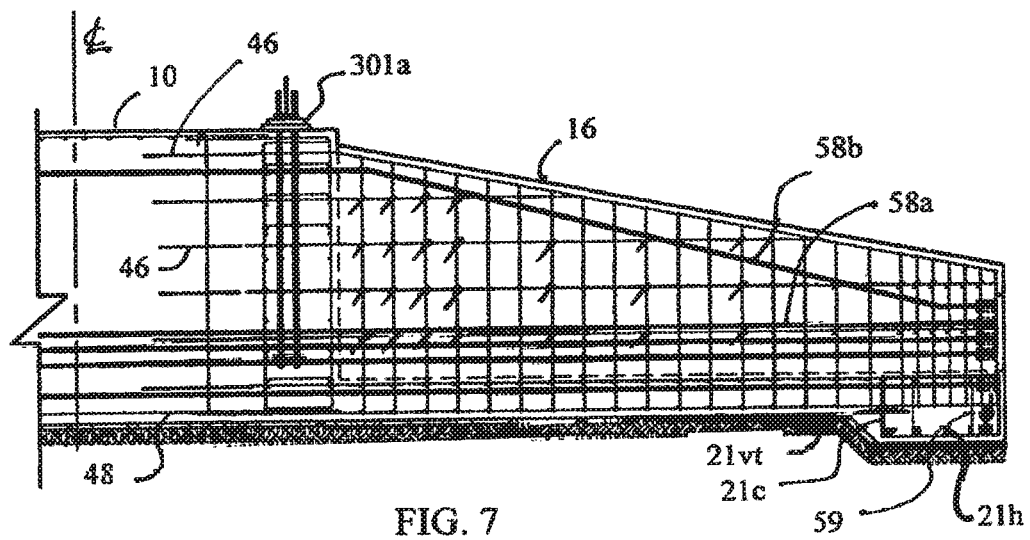
FIG. 7 is a partial sectional elevation of the foundation showing different post-tension reinforcing groups of a rib along with post-tension dowels for connecting to a pedestal and a slab.
Figure 8:
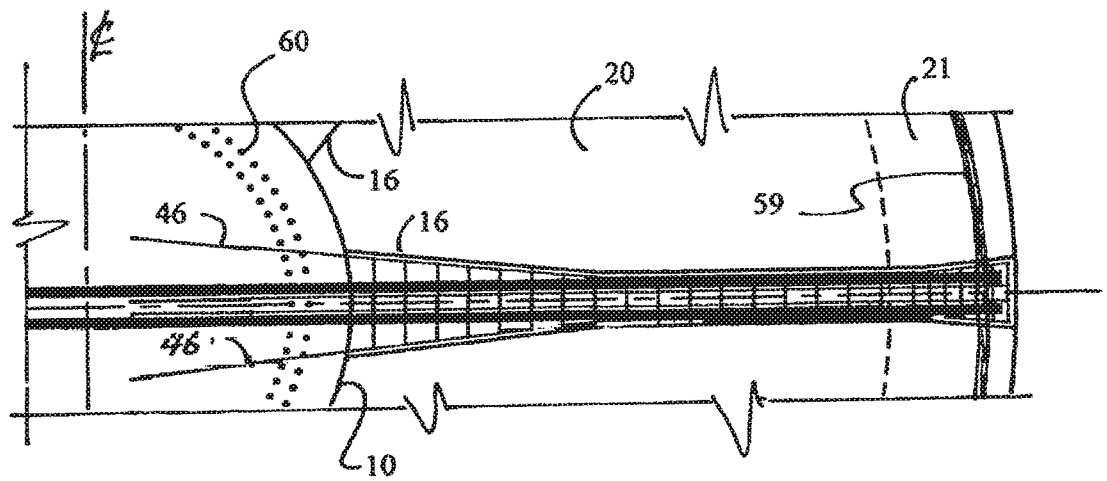
FIG. 8 is a partial plan view of the foundation showing different post-tension reinforcing groups of a rib along with dowels for connecting to a pedestal and a slab.
Figure 9:
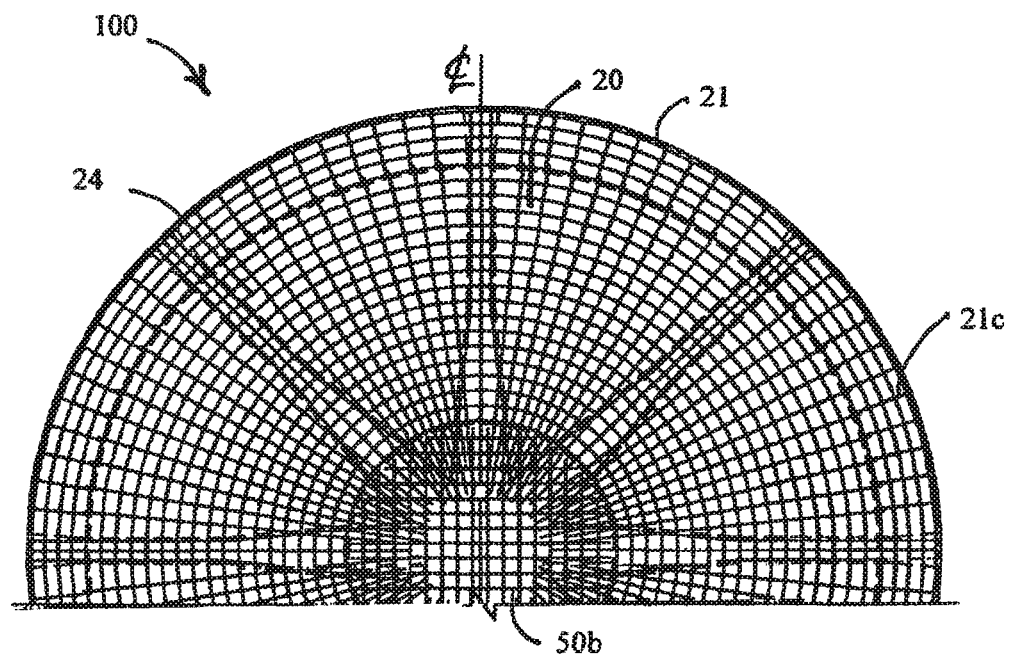
FIG. 9 is a slab reinforcing plan view showing the different reinforcing groups of a lower slab reinforcing assembly along with perimeter reinforcing cages.
Figure 10:
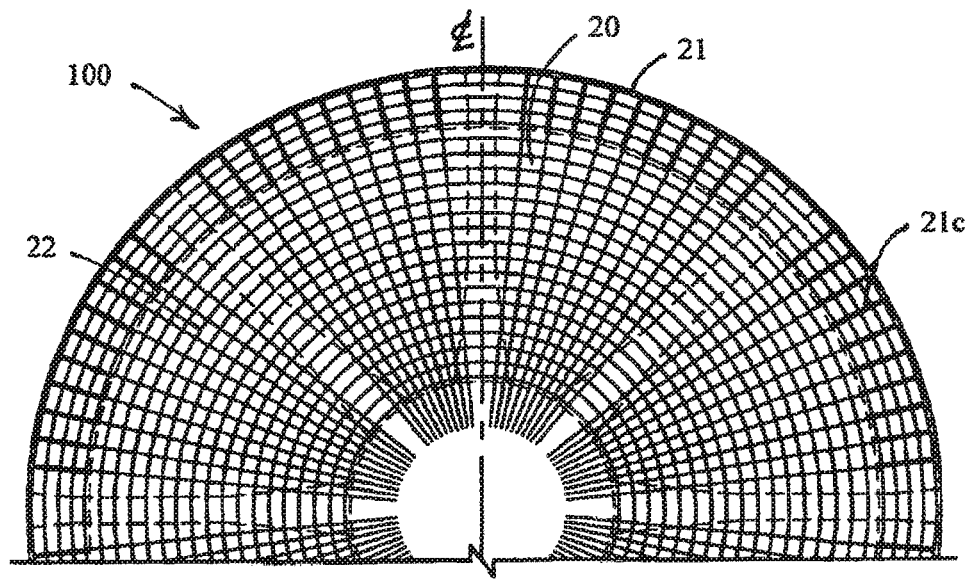
FIG. 10 is a slab reinforcing plan view showing the different reinforcing groups of an upper slab reinforcing assembly along with perimeter reinforcing cages.
Figure 26:
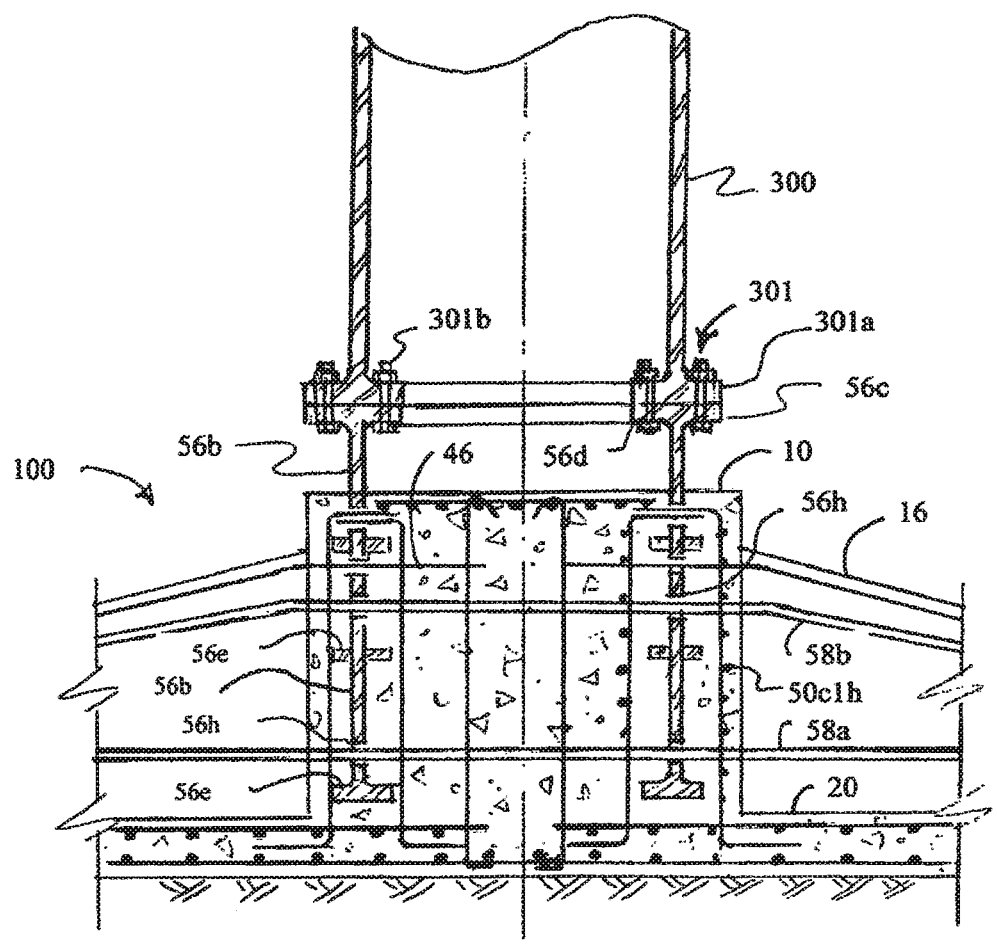
FIG. 26 is a section view of a foundation having an embedded tower section in the pedestal.
Figure 27:
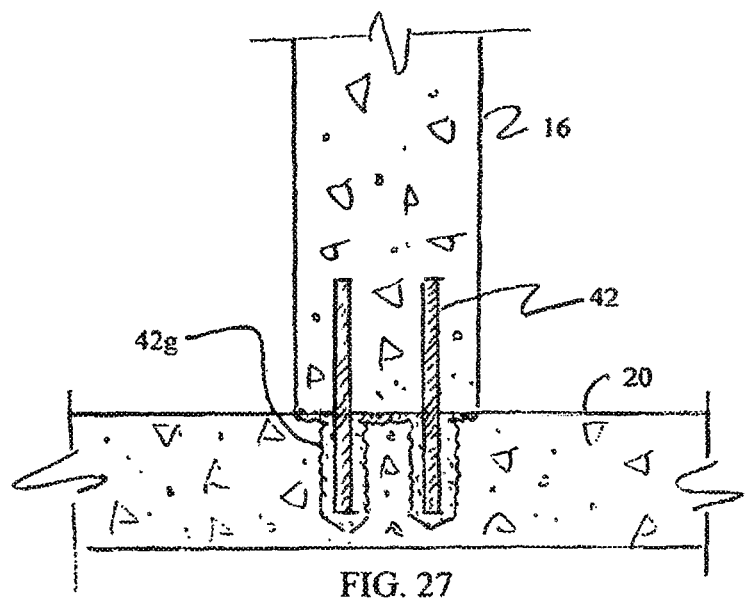
FIG. 27 is a connection detail showing an alternative doweling method between a prefabricated rib and a slab where dowels extend down from the rib into grouted sleeves arranged in a slab.
Figure 28:
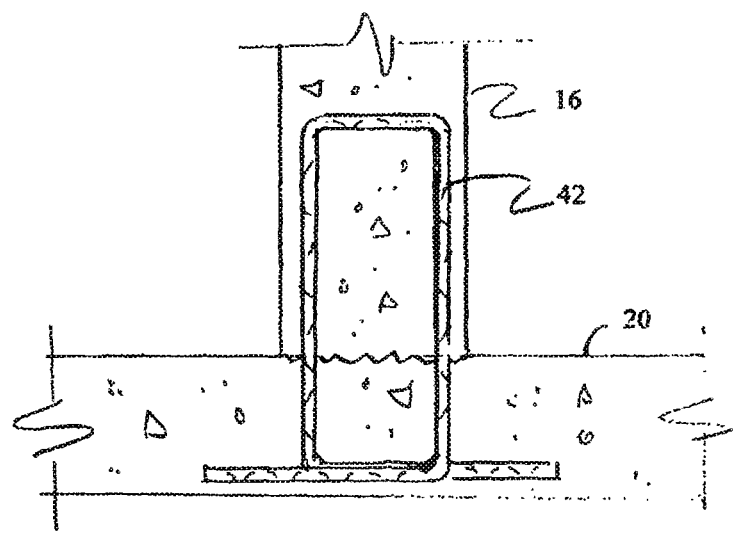
FIG. 28 is a connection detail showing an alternative doweling method between a cast-in-situ rib and a slab where dowels extend up from the slab into rib forms to mesh with rib reinforcing elements.
Figure 29:
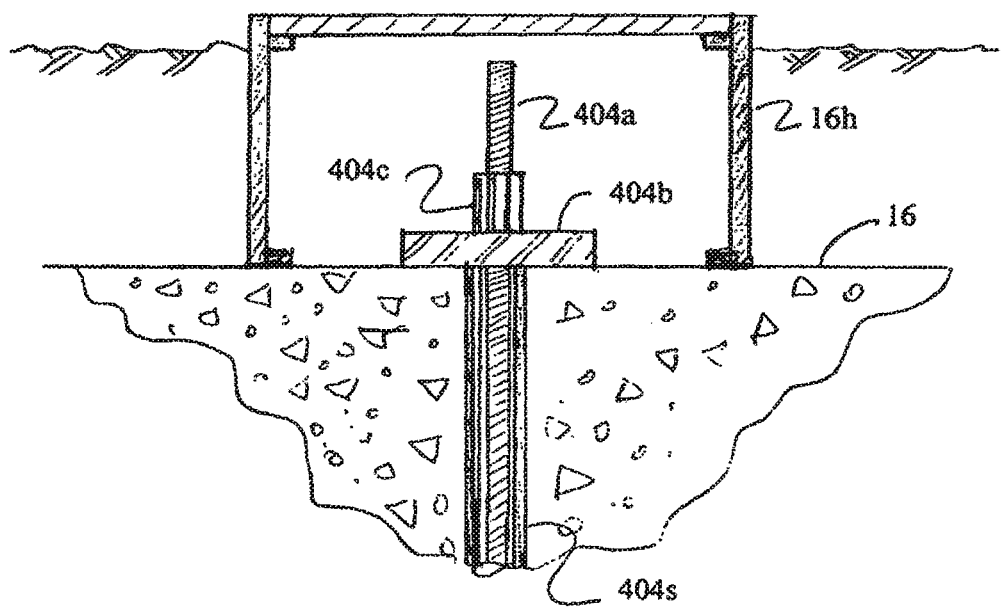
FIG. 29 is a connection detail showing an un-bonded rock anchor connection to the foundation with bearing and tensioning elements receiving an anchor bolt extending through vertical holes in the foundation.
Figure 30:
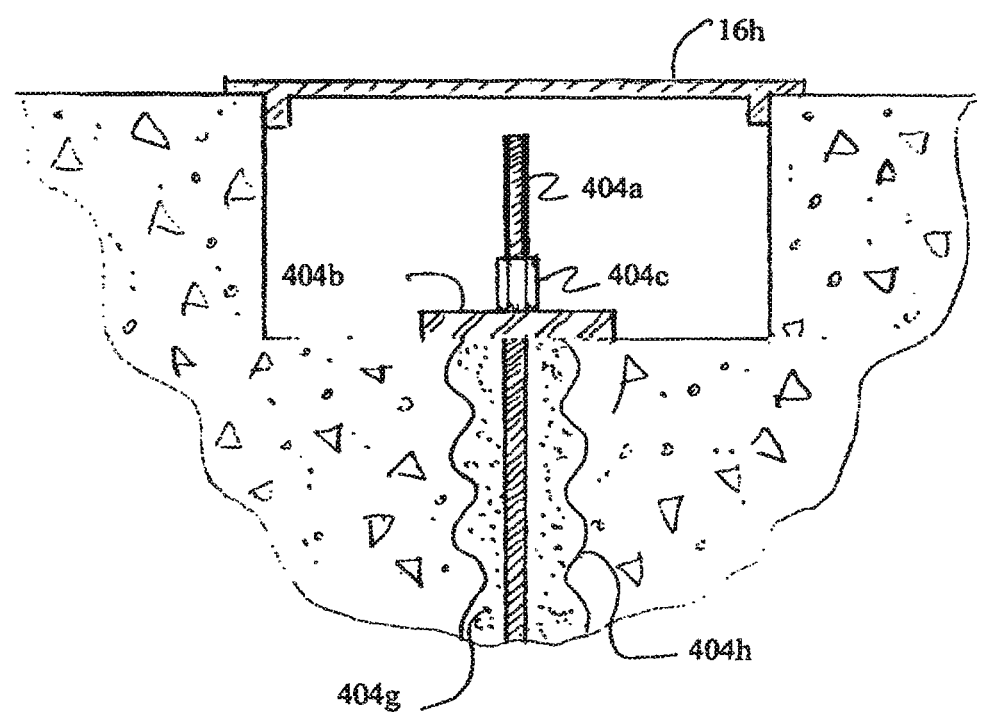
FIG. 30 is a connection detail showing a bonded rock anchor connection to the foundation with bearing and tensioning elements receiving an anchor bolt extending through vertical holes in the foundation. The anchor is tensioned and grouted to a specific depth. The anchor may be configured to function as a pile anchor.

As shown in FIGS. 7 and 26, radial post-tension tendons 58 and rebar reinforcing elements 46 extending from the ribs 16 and the slab 20 pass through the pedestal reinforcing cage 50, or through holes 56h in the embedded metal tower section 56b.

As shown in FIG. 17-22, post-tensioning elements 58, 58a, 58b, 58c are flared horizontally, profiled vertically, arranged in matrix groups, spaced and draped in a manner that allows for optimum utilization of post-tensioning and ease of installation while avoiding tendon congestion and stress concentrations as tendons 58, 58a, 58b, 58c crisscross in the pedestal 10. The regrouping of tendons to form a flat and wide matrix along each axis was found to be effective in avoiding tendon congestion especially in the pedestal 10. The flat and wide matrix of tendons are placed as high or as low as possible to maximize their moment arms and optimize their contributed moment capacity. For corrosion protection, bonded (multi-strand and grouted) or un-bonded encapsulated (mono-strand) post-tensioning elements and their associated construction techniques can be used in the foundation 100.

The rib's thickness 16th can be gradually increased at the connection to the pedestal 10 to increase rib flexural, shear and torsional capacity and enhance pedestal confinement 16m. The post-tensioning requirements can be reduced by engaging dowels 46 at the rib-to-pedestal connection and by extending fully developed radial dowels 46, 22r, 24r from the rib 16 and the slab 20 deep into the pedestal 10, thus allowing passive reinforcing to participate in the connection.

Figure 2:
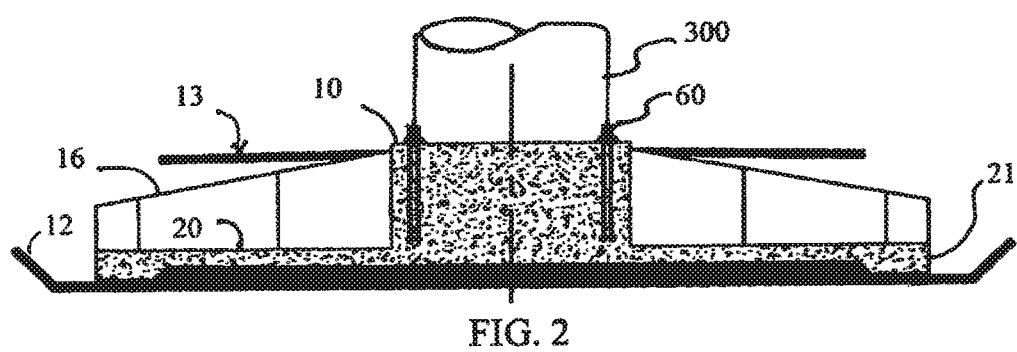
FIG. 2 is a sectional elevation view of the foundation cut near the ribs.
Figure 3:
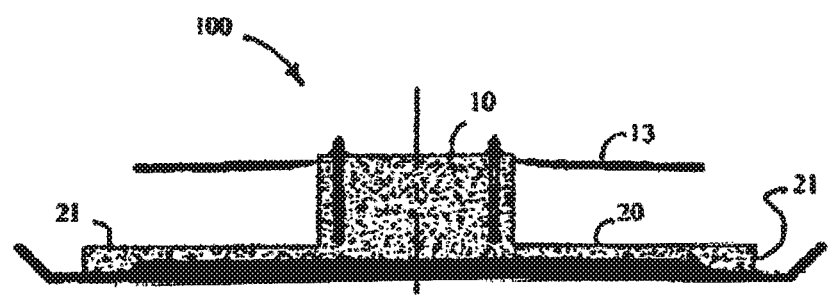
FIG. 3 is sectional elevation view of the foundation.

In another embodiment, as shown in FIG. 2, ribs 16 top surface can be tapered to a substantial slope extending vertically to an elevation near the top of pedestal 10 allowing the ribs 16 to benefit from diaphragm action at their inner zone and also provide lateral support for the full height of the pedestal 10 and to provide concrete confinement at the highly stressed zone at the top of pedestal 10 under tower base flange 301.

The foundation may have a circular or polygonal foot print. The thickened slab edge 21 (or perimeter beam 190 may extend above or below the foundation. A shallow perimeter beam 190 profile should be selected for ease of backfilling and improved accessibility for roller compactors during the backfilling of the foundation 100. A thickened slab ring beam 21 may be designed to be at an offset distance away from the slab edge allowing the slab segment, outside the ring, to behave as a cantilever. This configuration reduces slab 20 span and deflections as well as the volume of concrete required in the foundation 100.

Figure 5:
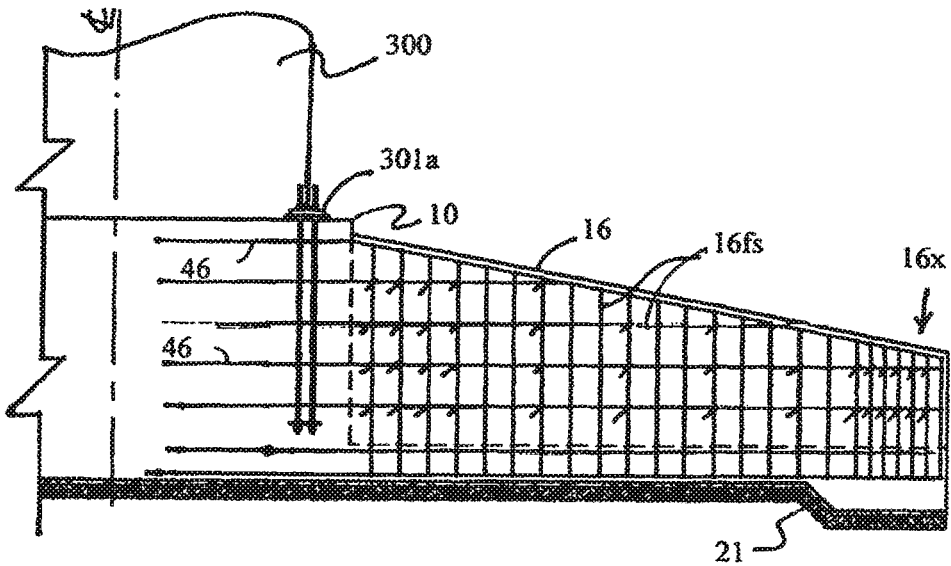
FIG. 5 is a partial sectional elevation of the foundation showing different bar reinforcing groups of a rib along with dowels for connecting to a pedestal and a slab.

As shown in FIG. 5, the configuration of the slab 20 and its continuous reinforcing including that of the thickened slab ring beam 21 is configured to create a rigid composite connection to the ribs 16 with high stiffness which is sufficient to allow adjoining ribs 16 to participate more in resisting the loads and thus reducing local deflections and increasing overall foundation stiffness in addition to reducing the unsupported length of cantilever radial ribs 16.

Figure 13:
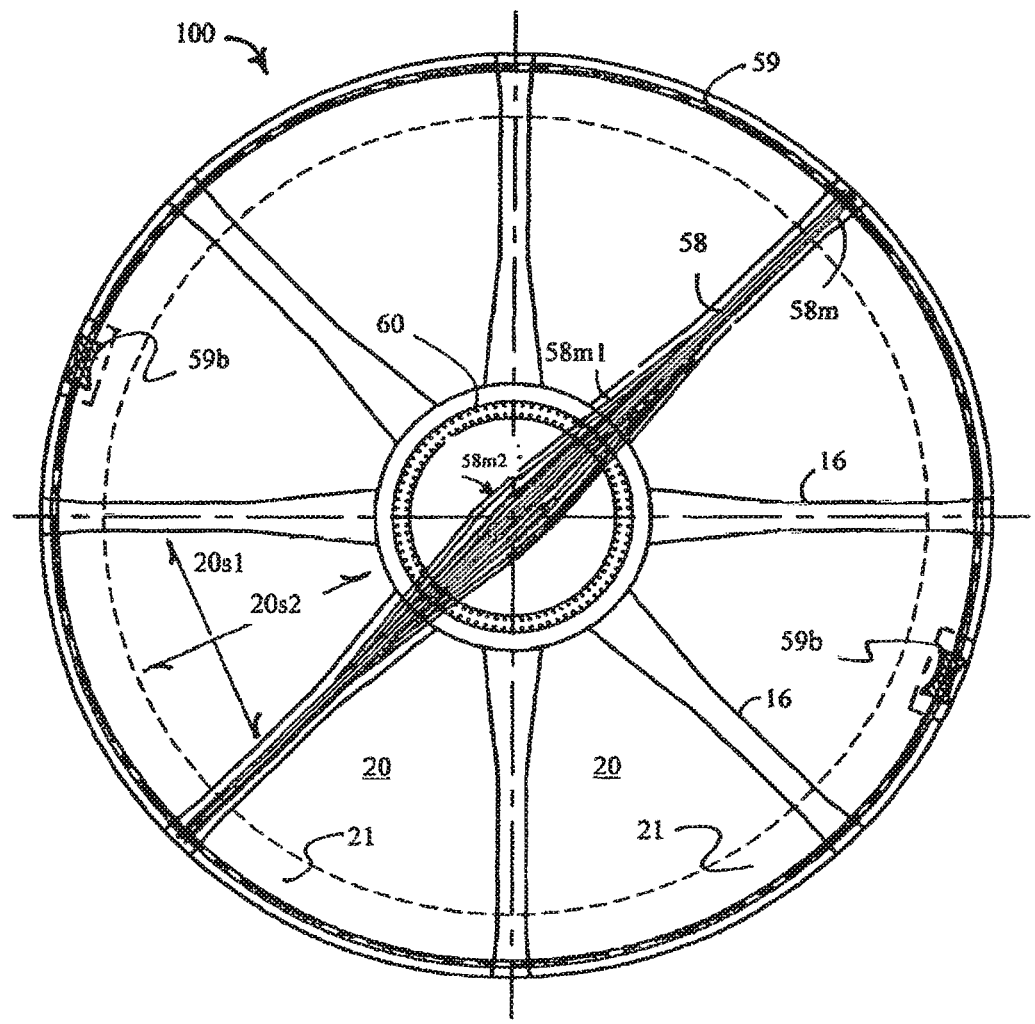
FIG. 13 is a plan view of a foundation with a heavily post tensioned ring beam using ring anchors and 180-degree ring tendons.
Figure 14:
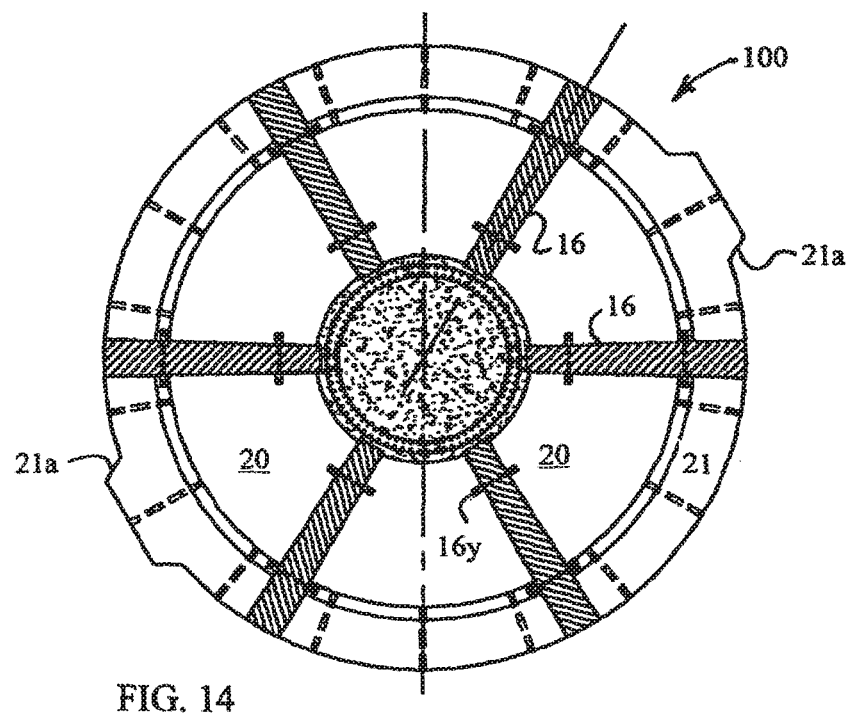
FIG. 14 is a plan view of a partially prefabricated foundation with a heavily post tensioned ring beam extending above the slab and using ring anchors and 180-degree ring tendons with anchor blisters extending from the foundation. General arrangement of temporary rib support and drains is shown.
Figure 15:
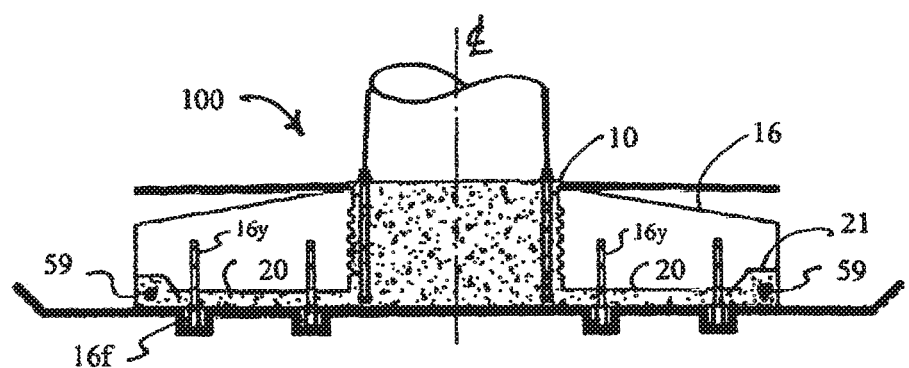
FIG. 15 is a sectional elevation view of a partially prefabricated foundation with a heavily post tensioned ring beam extending above the slab and using ring anchors and 180-degree ring tendons with anchor blisters extending from the foundation. General arrangement of temporary rib support and their corresponding sub-footings is shown.
Figure 16:
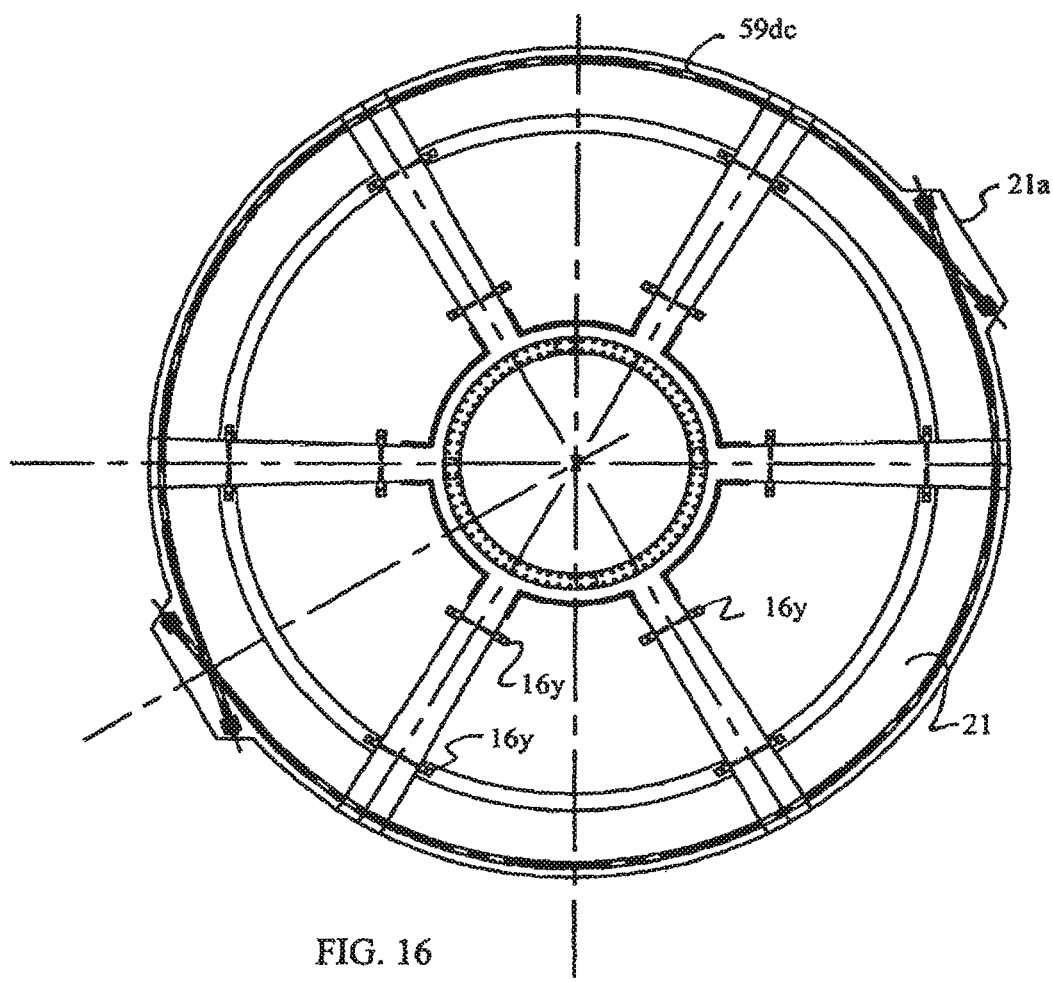
FIG. 16 is a plan view of a partially prefabricated foundation with a heavily post tensioned ring beam extending above the slab and using ring anchors and 180-degree ring tendons with anchor blisters extending from the foundation. General arrangement of temporary rib support and drains is shown.

In a preferred embodiment, as shown in FIG. 13, the pairing of the ribs 16 on distal ends 10x and the continuous perimeter beam 21 construction yield a cost effective layout of post-tensioning that uses a small number of tendons and corresponding anchors 59b as well as reduces friction losses by avoiding sharp turns in tendon layout. The tendons 58 of the ribs 16 are anchored in a matrix array 58m at the outer end of the rib 16 and extend horizontally and diagonally along the rib 16 to split into at least two groups 58a and 58b one near the bottom and the other near the top of the rib as it connects to the pedestal 10. The tendons 58 are more concentrated at the bottom than at the top in a concentric prestressing pattern 58m1 that is intended to maximize the structural capacity of the foundation and meet the flexure and shear demand of the governing load cases.

Ribs 16 may have thickened flanges, at their connection to the pedestal 10 that may also house post tensioning anchors for tendons 58 extending from ribs 16 on the opposite side of pedestal 10. The ribs 16 may also have post tensioning anchors along their sides or tops if tendon curtailment methods are applied in the design. The ribs 16 may also have embedded loop anchors if looping of tendons is used in the design. Loop anchors 70 could also be used in the pedestal 10 to support and vertically prestress precast concrete towers 300b, or concrete stems 11.

Figure 21:
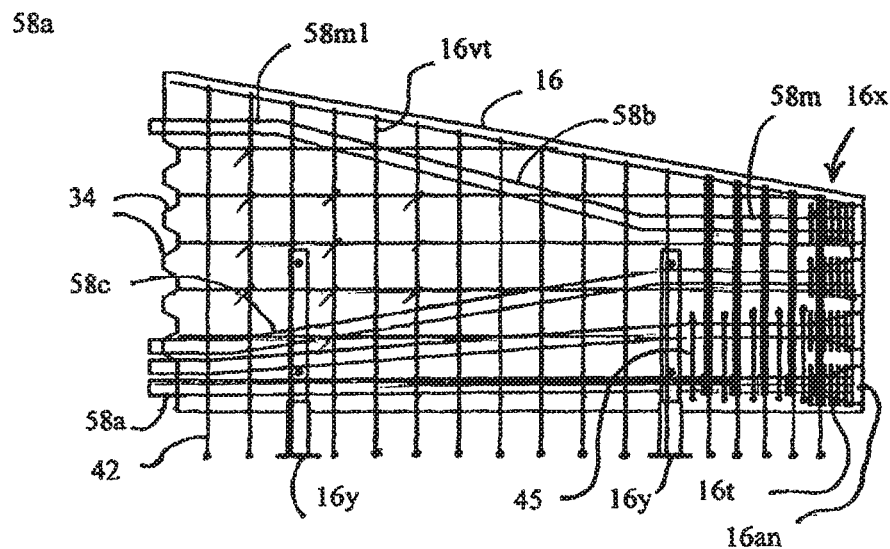
FIG. 21 is an elevation view of a prefabricated rib showing post-tensioning ducts and an anchor arrangement. Rib bottom dowels for slab connection and concrete shear key corrugations are shown.
Figure 22:
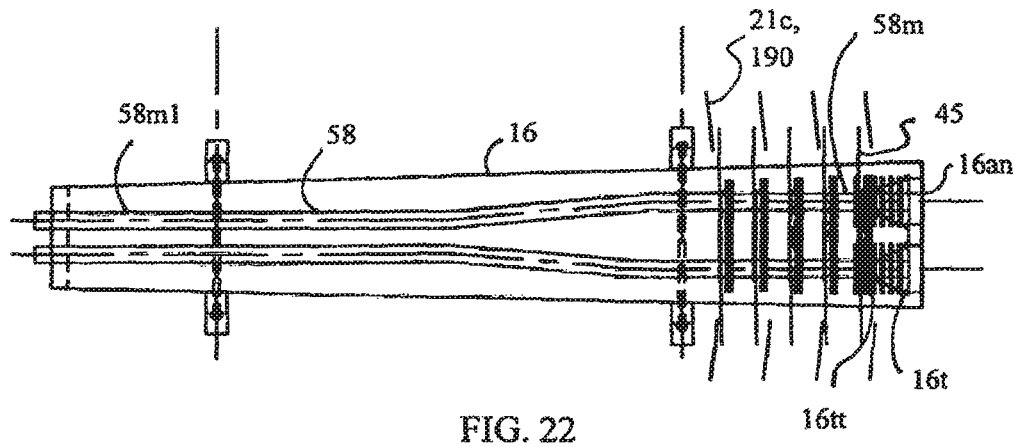
FIG. 22 is a plan view of a prefabricated rib showing post-tensioning ducts and an anchor arrangement. Rib side dowels for the ring beam connection and concrete shear key corrugations are shown.
Figure 23:
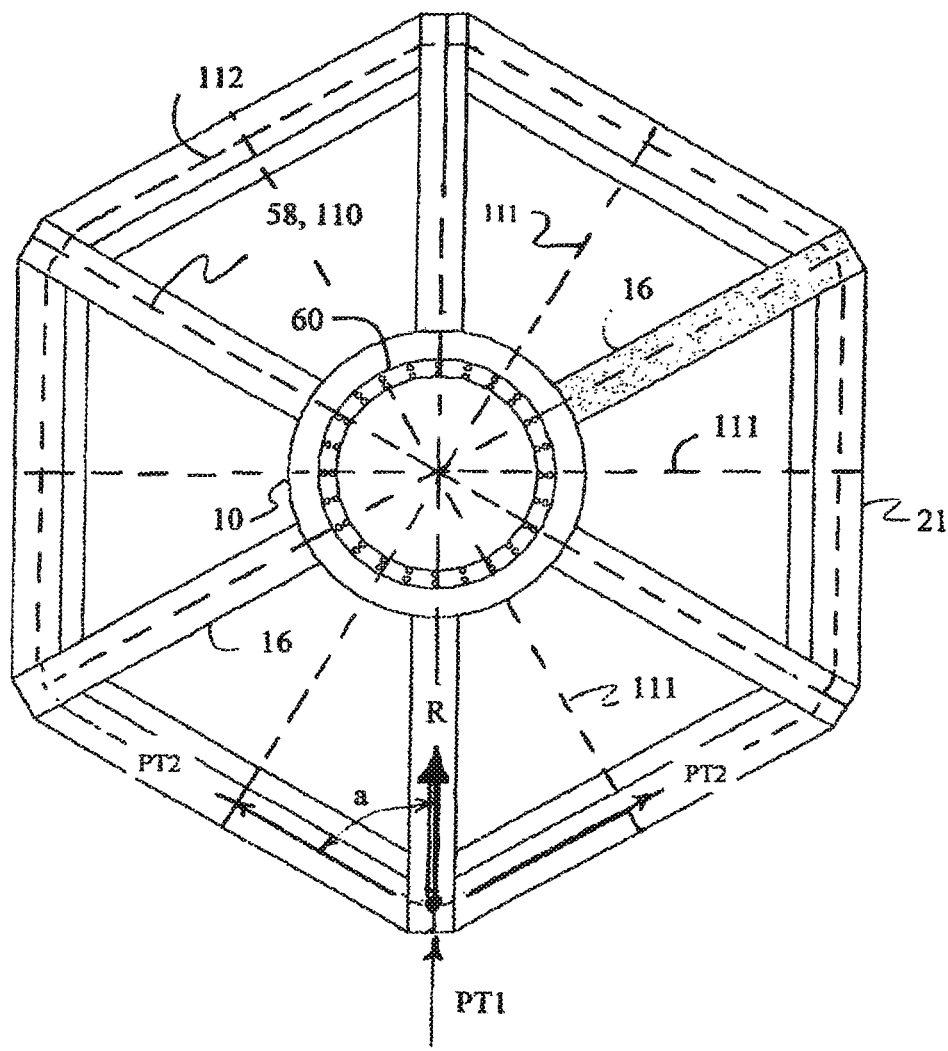
FIG. 23 is a plan view of a foundation having a hexagonal footprint and a thickened and heavily post tensioned slab edge. A simplified force diagram shows the cumulative resultant (R) of radial post tension (PT1) and perimeter post tension (PT2). The resultant is the effective post-tension force acting at rib end is defined by the equation: R=PT1+2 PT2 (cos a), where (a) is the angle between PT1 and PT2. In this configuration all ribs are subjected to equal heavy eccentric post compression stresses that maximize rib structural resistant to governing tower loads.
Figure 24:
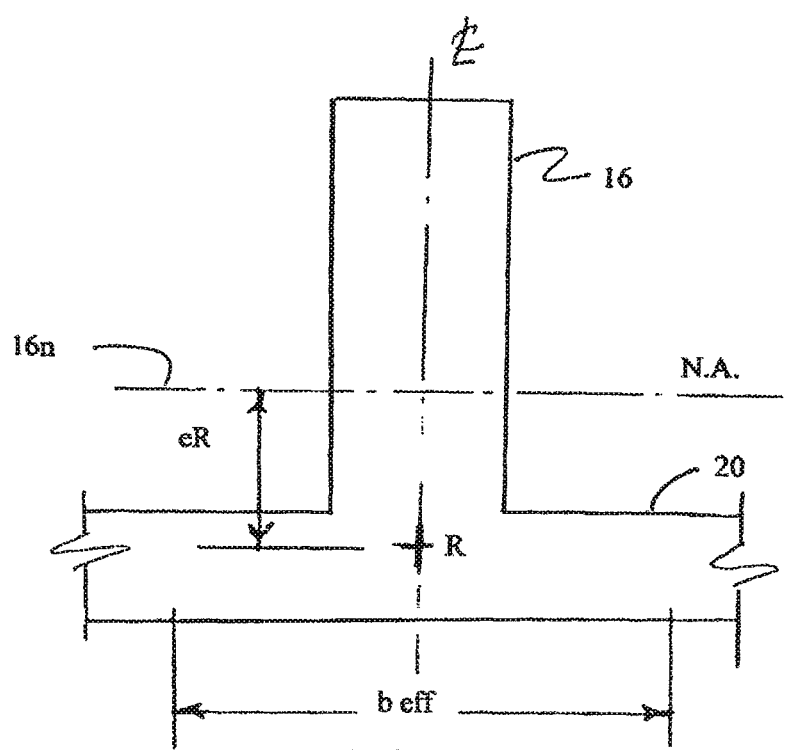
FIG. 24 is the effective rib cross section showing the neutral axis 16$n$ and the eccentricity (eR) of the effective post tensioning force R.
Figure 25A:
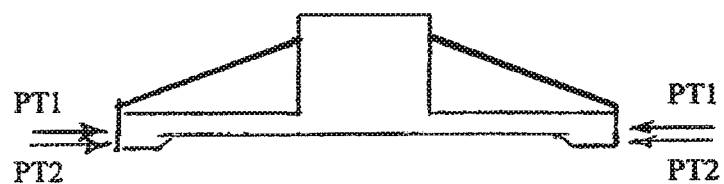
FIG. 25$a$ is a diagram that shows a foundation cross section post tensioning, before a tower dead load and backfilling are added.
Figure 25B:
Figure 25C:
Figure 25D:
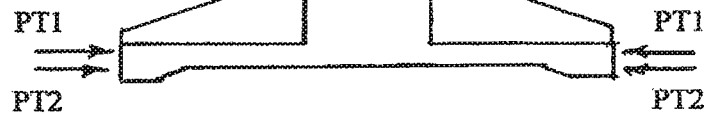
Figure 25D:
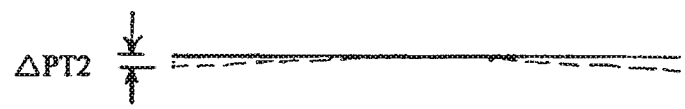

As shown in FIG. 21, the tendons 58 in ribs 16 extend horizontally and diagonally to be split into three distinctive groups as they enter the pedestal 10. The first group 58a with more tendons is placed at the bottom of ribs 16 or in the slab 10 to create camber for reducing deflections and improving foundation soil contact as well as meet the high flexural demand from the governing load cases, and the second group 58b has a slope up diagonally to follow the geometry of the top of the rib as they enter the pedestal 10. The third group 58c is in the middle and it starts horizontal at rib anchor block 16an and diagonally slopes down towards the bottom of the rib 16 to enter the pedestal 10 for optimum use of the tendons 58. Tendons 58 in the pedestal 10 are fanned and flared into groups in a flat pattern 58m2 to simplify the installation and maximize their utilization by increasing their effective depth or moment arms measured from the top or the bottom of the structural concrete. Additional post-tensioning groups for shear resistance can be provided by providing tendons 58 that traverse the shear failure plane in the ribs 16.

In another embodiment, as shown in FIG. 21, the post-tensioning in the ribs 16 consist of three distinctive groups: 1. A bottom group of tendons 58a that is horizontal at the bottom of the rib 16 and in the slab 20 and may be grouped with slab post tensioning, 2. A top group of tendons 58b that is diagonally sloped upward to follow the geometry of the rib top, 3. An optional middle group of tendons 58c that starts horizontal at rib outer edge 16x and is diagonally sloped down towards the bottom of the rib 16 to eliminate dead load deflections and keep the ribs 16 and pedestal 10 under post compression during normal operating conditions and also provide the high demand of post-tensioning capacity required at the bottom of the rib 16 for downwind load cases, and traverse the shear failure plane for ribs 16 in the governing downwind load cases and provide additional shear resisting capacity in each rib 16, such that the number of strands in the bottom of the rib 16 and the pedestal 10 is much higher than that at the top thus causing a multi-axial, heavy, eccentric horizontal post compression in the foundation after all the tendons 58 are jacked.

Alternately, as shown in FIG. 13, anchor-blocks for perimeter or circumferential post-tension tendons can be placed at perimeter beams 190, (ring beams 21) at the thickened slab, at the edge of the foundation on top of perimeter beams 190 or on the sides of ribs 16. A preferred layout with two anchor blocks 21a on opposite sides of the foundation and with a semi-circular (180-degree) tendon arrangement is shown in FIG. 13. Ring tendons 59 with ring anchors 59b (such as dog-bone anchors) can be used, with perimeter or circumferential tendons, to avoid having blisters on the foundation 100. Styrofoam block-outs 53a can be placed in the foundation 100 according to anchor manufacturer recommended dimensions. When the concrete reaches the sufficient strength ring tendons 58 are jacked and ring anchors 59b grouted.

In another embodiment circumferential post tensioning may be made with multiple tiers of tendons 59, in this case anchor block 21a locations or ring anchor 59b locations for each tier may be staggered around the perimeter of the foundation 100p to reduce stress concentration. Corrosion protection must be provided at anchor locations. Perimeter post-tensioning 112, or circumferential post-tensioning 59 can be made with bundled, un-bonded mono-strands without encapsulation.

The foundation may be made with a network of pre-stressed concrete elements that can be structurally analyzed, with the strut and tie method. A three-dimensional structure made of an array of vertically and horizontally oriented truss-girders joined at the center may be used, with major tension chords reinforced with prestressing tendons, based on both upwind and downwind load cases. The tension forces in the structure are resisted largely by prestressing elements and passive reinforcing. Compression forces are resisted largely by the concrete elements. The structure can be analyzed as a circumferential array of vertically oriented trusses that are fixed at their inner ends 16c to the central pedestal 10 and are laterally stabilized at their bottom by a horizontal trussed diaphragm formed by perimeter post tensioning 59a, in the slab 20 or perimeter beam 190, and radial bottom tendons 58 in the ribs 16 or the slab 20.

In another embodiment, as shown in FIG. 1, the fatigue resistant foundation 100 comprises a circumferential array of vertically oriented eccentrically prestressed cantilevered girders 16 that are fixed at their inner ends 16c to a central pedestal 10 that is laterally supported and confined through most of its height by rib concrete, and the ribs 16 and pedestal 10 are laterally stabilized at their bottom by a horizontal prestressed concrete trussed diaphragm, with a continuous slab 20, and the prestressing is provided by radial tendons 58 in the ribs 16 (or the slab 20) and circumferential post tensioning elements 59. The radial 58, and circumferential 59 tendons provide eccentric prestressing in the ribs 16 and the pedestal 10. The pedestal 10 is vertically pre-stressed by an array of vertically extending anchor bolt circle 60 and is structurally fixed to a tower base 301 of a pylon. The slab is prestressed with tendons 110, 111 and 112 and circumferential tendons 59.

In another preferred embodiment the construction of the foundation 100 may utilize pre-assembled slab perimeter reinforcing cages 21c, built in segments with overlapping spliced bars at their ends, and each having an array of shear resisting vertical ties 21vt and flexure resisting horizontal bars 21h as well as anchor zone reinforcing. Slab perimeter cages 21c or perimeter beam reinforcing cages, 190c can be preassembled and then placed in the foundation.

Figure 4:
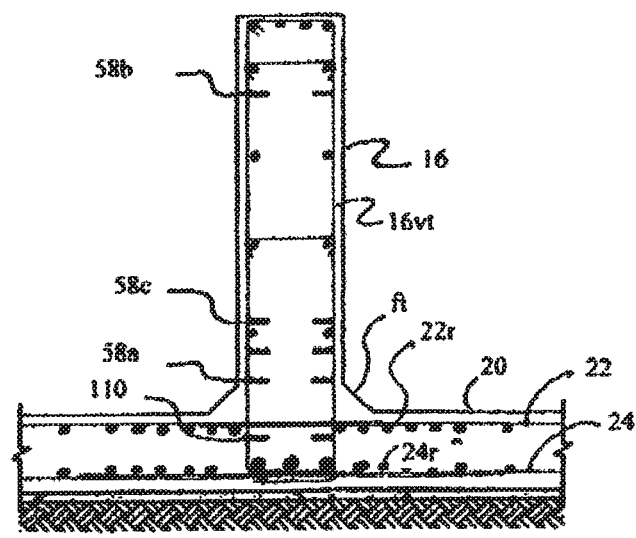
FIG. 4 is a section detail of a cast-in-situ slab and pedestal showing the different reinforcing groups in both elements
Figure 6:
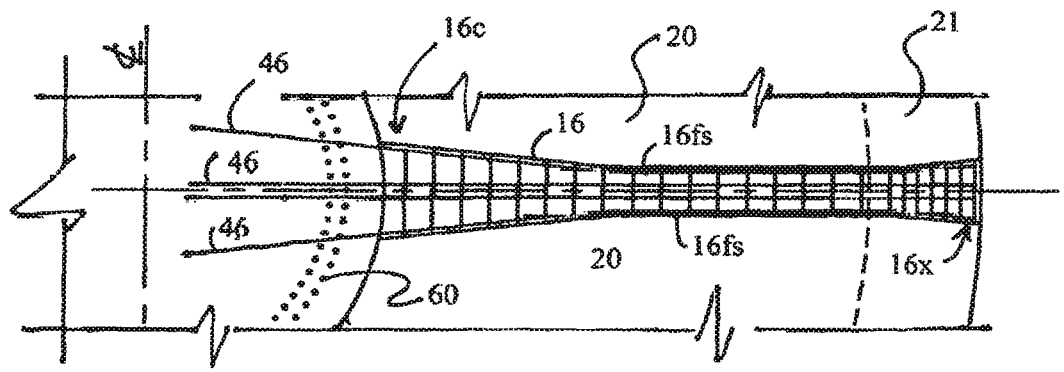
FIG. 6 is a partial plan view of the foundation showing different bar reinforcing groups of a rib along with dowels for connecting to a pedestal and a slab.

As shown in FIGS. 4, 5 and 6, the foundation has specific reinforcing groups. The ribs 16 have flexure reinforcing tendons 58 concentrated at the bottom and the top, vertical stirrups 16vt for shear reinforcing tightly spaced in high shear zones along rib inner end 16c, rib skin reinforcing on each face 16fs and bursting and splitting reinforcing made of horizontal hairpins 16hp extending between the rib skin reinforcing 16fs, as well as straight, hooked or U-shaped horizontal dowels 46 for embedment into the pedestal 10 and vertical dowels 42, at the bottom of the ribs 16 are used, for composite action with the slab 20. As shown in FIG. 4, the vertical stirrups 16vt also function as dowels for composite action of the slab 20. The dowels may be spaced such that they mesh between slab reinforcing bars without geometric interference. The rib reinforcing 16re is built in preassembled cages and placed over the slab reinforcing 22, 24. In order to maximize shear capacity vertical stirrups 16vt are placed side-by-side, in pairs, at the inner rib zone 16c where the shear demand is high.

Anchor zones, as shown in FIGS. 5, 6, 21, 22, are provided with heavy reinforcing with trim bar and ties 16tt as well as surface reinforcing at the anchor block location. The ribs 16 may also have horizontal reinforcing dowels 45, perpendicular to the ribs 16, to facilitate the structural continuity of the supported perimeter beams 190 or the thickened slab 21, across the width of the rib 16, by means of splicing the dowels 45 with perimeter reinforcing 21c, 190c.

Figure 11:
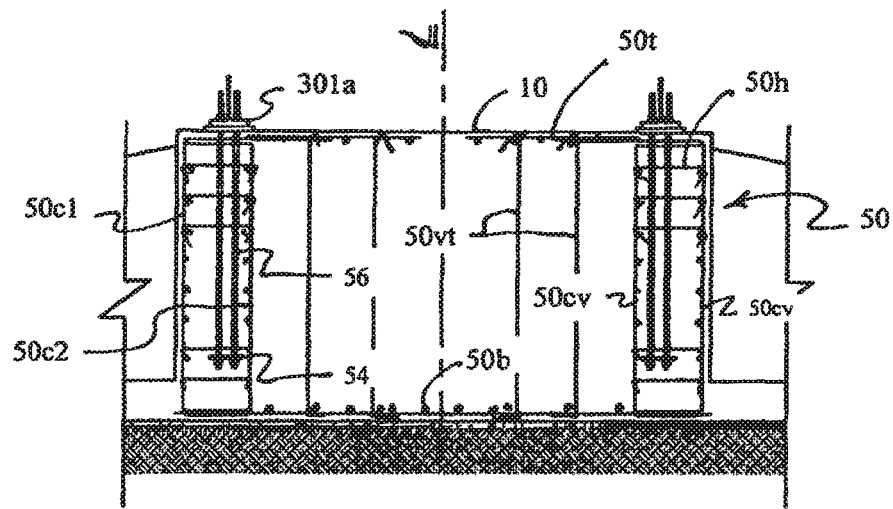
FIG. 11 is a vertical section view of a pedestal showing the different bar reinforcing groups of a pedestal including the two confinement cages surrounding the anchor bolt assembly. Rib and slab dowels are not shown for clarity.
Figure 12:
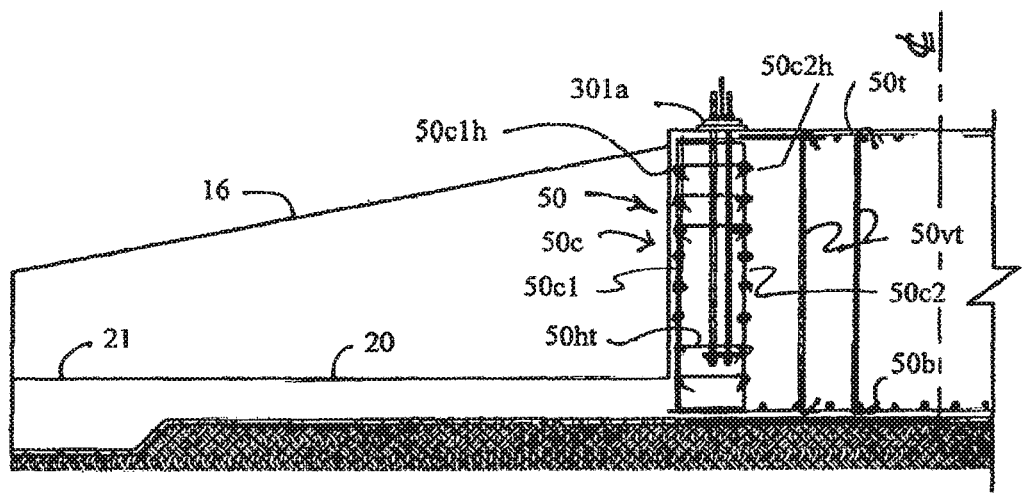
FIG. 12 is a partial vertical section view of the foundation showing different bar reinforcing groups of a pedestal including the two confinement cages surrounding the anchor bolt assembly. Rib and slab dowels are not shown for clarity.

The pedestal 10, as shown in FIG. 11 and FIG. 12, has a horizontal mesh 50t at the top and skin reinforcing 50c1 at all surfaces as well as at least one cage 50, around the anchor bolt assembly 60, comprising vertical tightly meshed bursting reinforcing 50c including two cylindrical meshes 50c1 &50c2 confining the anchor bolts 56 each comprising horizontal hoops 50c1h &50c2h and either C or Z-Shaped bars 50cv and a radial array of horizontal hair-pins 16hp or stirrups tying both cylindrical meshes 50c1 &50c2 or spiral stirrups each housing a number of anchor bolts 56. The pedestal 10 cage assembly may comprise two concentric tightly meshed cages 50c1 &50c2 surrounding the anchor bolts 56 one from the inside and the other from the outside with a radial array of bursting and splitting resistant hairpins 16hp extending between the two cages 50c1 and 50c2. Additionally, an array of vertically oriented pedestal 10 vertical bursting out of plane stress resistant reinforcing group of reinforcing elements, comprising circumferentially spaced vertical hairpins 50vt extending between said top horizontal mesh 50t and a horizontal bottom reinforcing mesh 50b in the pedestal 10 or slab 20, is included in the pedestal cage 50. The vertical hairpins 50vt in pedestal core 10a also function as supports to secure tendons in the pedestal 10 during construction.

Upper 22 and lower 24 slab reinforcing meshes may have any pattern such as a square grid, a circular array with radial pattern or overlapping pie-shaped segments. Additionally, there may be an array of slab reinforcing 22, 24 locally arranged beneath the ribs 16 oriented parallel to the ribs 16 and extending into the pedestal 10 to facilitate composite action. The slab 20 may also be reinforced with post-tensioning elements in any pattern including radial, circumferential, perimeter or a square grid.

The foundation may utilize many prefabricated components including rebar meshes and cages, pedestal cage assembly, pre-cut post-tensioning strands, preassembled post-tensioning bundles, pre-cut post-tensioning duct sections and prefabricated concrete forms.

Reusable rib forms 16b may be utilized to form the foundation perimeter 100p, the ribs 16 and the pedestal 10. Forms can be made to be segmented, universal, expandable and adjustable to work for different foundation sizes. Rib forms 16b can be made with adjustable supports 16y to elevate the forms above the wet slab 20 concrete during construction if the foundation is built in one pour. Rib forms 16b may sit directly on the hardened concrete slab 20 if the foundation is built in two pours. Rib forms 16b may be made with two side-panels of stiffened non-stick plates and an array of adjustable horizontal spacers between the panels to maintain proper geometry and resist the lateral pressure of wet concrete. Rib forms 16b and pedestal forms 102 may be fitted with lifting lugs 32 or means for receiving and supporting ladders, catwalks 95 and work platforms 95 to allow for access around the foundation 100. The forms may have means for securing post-tension anchors and hardware at specific spacing during construction. The forms may also have means for hanging and supporting rib reinforcing cages.

The foundation 100 may be supported on piles 400, or micro-piles 401 or piers 402 or rammed-aggregate piers 405. The foundation 100 may receive rock (or soil) anchors 404 in a conventional manner.

A construction site is prepared by excavation, grading and compaction soil for the foundation. The foundation 100 may be set on a mud slab 14 or on compacted granular fill. The mud slab 14 is a thin plain concrete layer intended to provide a clean and level base for foundation installation.

Figure 48:
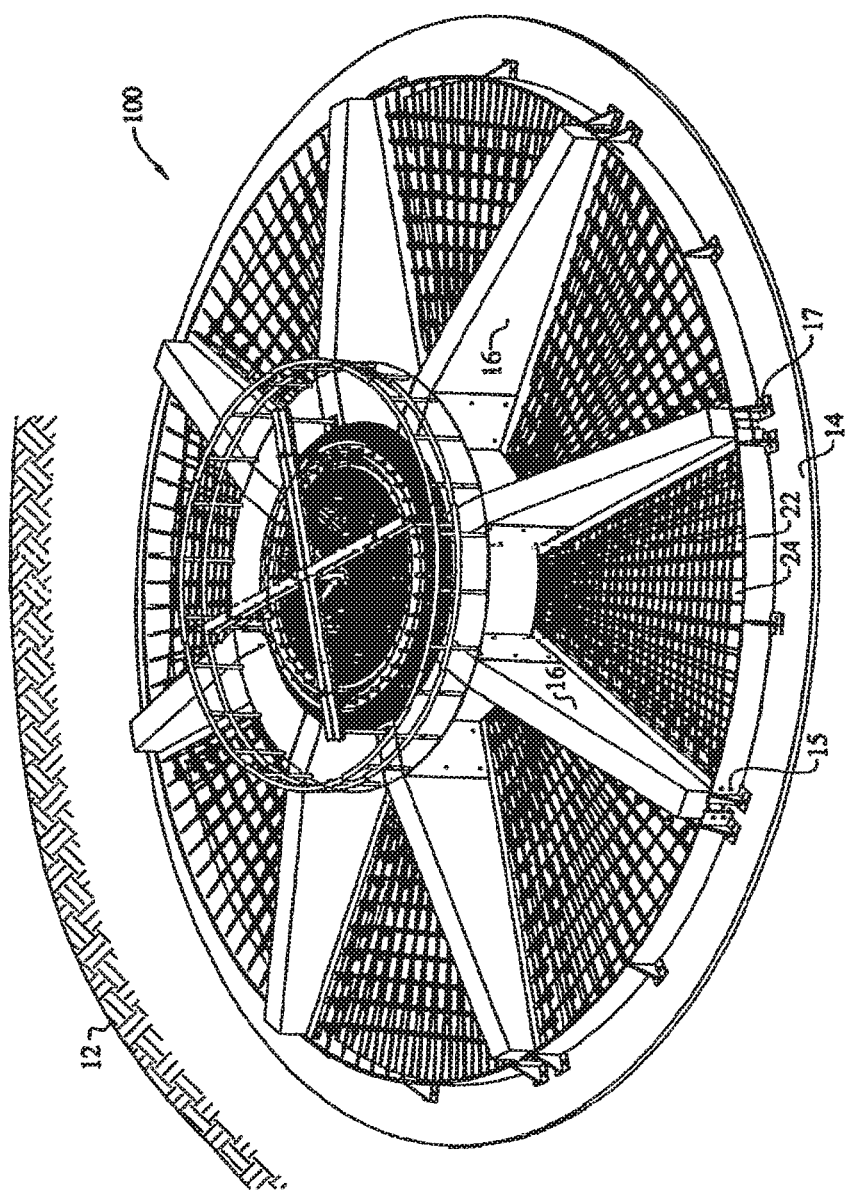
FIG. 48 is a perspective view of the prefabricated rib foundation option showing the rebar before pouring the concrete.

In one embodiment, as shown in FIG. 48 after the foundation site has been prepared, the slab reinforcing 22, 24 is placed inside slab forms 17 and the slab 20 is poured in place with dowels 42 extending up from the slab 20 to receive the ribs 16 and the pedestal 10 in a second pour. The rib rebar 16fs and pedestal rebar 50 and cage 60 placement with post-tension tendons 58 (or duct) placement are set in place rib forms 16b and pedestal forms 102 are installed before a second pour is carried out. Alternatively, the foundation 100 can be poured in a single pour with the use of accelerators in the concrete mix and by following a well-designed concrete pour sequence. A set of small footings 16f, placed within the mud slab, can be used to support and elevate the rib forms 16b and pedestal forms 102 during construction. Slab 20, pedestal 10 and rib 16 reinforcing elements are assembled in the foundation 100. Forms are placed in the foundation around the perimeter, the ribs 16 and the pedestal 1.0 and the concrete is poured into the foundation 100 in a carefully designed pour sequence. One option is to start with slab 20 and the bottom part of the ribs 16 and the pedestal 10 with accelerator in the concrete mix to seal the bottom of rib 16 and pedestal forms 102 by the time the slab 20 concrete is finished, the ribs 16 and the pedestal 10 are poured jointly in small lifts.

When the concrete hardens to a specific strength, the post-tension elements are jacked and grouted as required. The tower base flange 301 is then attached to the pedestal 10 and grouted, and the tower anchor bolts 56 are tensioned after the grout reaches sufficient strength.

In a preferred embodiment, as shown in FIG. 13, the invention relates to a high stiffness, fatigue resistant, wind turbine foundation 100, supporting a wind generator with a multi-megawatt rating and subjected to extremely high cyclical upset loads that comprise the following components comprising: 1. a substantially wide central pedestal 10 with substantially solid core concrete construction 10a that is kept, through most of its height, under a combination of lateral structural concrete ribs 16 and confinement 16m, high vertical post-compression stress and high eccentric multi-axial lateral horizontal post-compression stress across its width, provided by said lateral ribs 16 and post-tensioning elements 58 that traverse the width of the pedestal 10, through non-segmented concrete construction, along multiple axes in a concentric pattern, and having a set of upright, circumferentially spaced anchor bolts 56, for providing the high vertical post-compression stress, extending through said pedestal 10, and having lower ends anchored to an anchor ring and upper ends projecting upwardly from said top end of said pedestal, said anchor bolts 56 being substantially bond protected along their length, said upper ends of said bolts 56 project upwardly from the pedestal 10 through a base flange 301a of an annular tower 300 structurally fixed atop the pedestal 10, and also having an upright heavily reinforced cage of tightly meshed rebar, and concentrically arranged around both sides of the anchor bolt cage with an opening to allow the passing of lateral load transfer elements 58, 46, 2. a support slab-on-grade 20, cast-in-situ out of concrete against the soil, in an excavation pit 12, of continuous construction and covering a footprint substantially larger than that of the pedestal 10 and having a thickness that is much smaller than the depth of the pedestal 10 and having a thickened edge 21 made of concrete integral with the support slab 20 and having horizontal post-tensioning elements 58, 59, 110, 111, 112 to keep the slab 20 under heavy multi-axial post compression, 3. an array of concentrically arranged ribs 16 made of deep girder construction, integral with the pedestal and support slab 20, and jointly east-in-situ with said pedestal 10, and extending vertically, above the slab 20, to an elevation near the top of pedestal 10 such that the pedestal 10 is laterally supported and substantially confined below the tower base flange 301, the ribs 16 having a width that is substantially smaller than that of the pedestal 10, and being arranged such that pairs of ribs 16 outwardly extend from opposite sides of the pedestal with post-tensioning elements 58 inwardly extending from the distal ends 16x of the ribs 16 through the pedestal 10, 4. reinforcing rebar and prestressed dowels 46 extending from the ribs 16 deep into the core of the pedestal 10 from distal ends 10x, and arrays of dowels 42, 46, made of rebar, extend between the slab 20 and each of the ribs 16 and the pedestal 10 along their conjunctions, 5. a suitable backfill material 13 placed over the slab 20, to stabilize the foundation 100 against overturning, followed by tower base installation and grouting, the foundation 100 is kept under heavy multi-axial post-compression such that tower loads are resisted by pairs of ribs 16, on distal ends 10x of the pedestal 10, wherein each pair of ribs 16 form a high stiffness continuous, non-segmented, laterally supported, post-tensioned girder extending between distal ends of the foundation 100 with continuous uninterrupted composite action from the slab-on-grade 20.

In another embodiment, slab post-tensioning can be arranged at any combination of perimeter, radial, diametric, or other patterns.

In another embodiment, composite action is further facilitated with radially oriented, reinforcing bars 24r1 locally arranged in the slab 20, beneath the ribs 16, and extended deep into the pedestal 10, in addition to an array of vertical dowels 42 extending between the rib and the slab 20 that function as shear connectors.

In a preferred embodiment, as shown in FIG. 13, the invention pertains to a foundation 100 for supporting a wind generator with a multi-megawatt rating and subjected to extremely high cyclical upset loads, with increased stiffness and improved fatigue resistant comprising: 1. a support slab-on-grade 20 of non-segmented continuous construction with a circular integral perimeter beam 190 with circumferential post tensioning elements 59 made of two 180-degree tendon segments forming a 360-degree circle, with anchors 59b at the opposite sides of the foundation, 2. a central cylindrical pedestal 10 integral with the support slab-on-grade 20 of solid non-segmented construction and having vertical post-tensioning elements, 56, 3. ribs 16 integral with the support slab 20 and the central pedestal 10, on top of the slab 20, with three or four pairs of ribs 16 radially extending from opposite sides of the pedestal 10 and post tensioning elements 58 extending axially and diagonally from anchors 16an placed at the distal ends 16x of the ribs 16 through the pedestal 10, such that the ribs 16 and the perimeter beams 190 function as a prestressed trussed diaphragm structure with the slab 20 acting as infill panels, and pairs of ribs 16 on distal ends 10x of the pedestal 10 function as continuous post-tensioned girders, that are free of construction joints, with continuous composite action from the slab 20 and the foundation 100 is kept under eccentric multi-axial horizontal and concentric vertical post-compression, with circumferential post-tensioning 112 in the slab 20 which effectively reduces stress amplitudes and deflections in the slab 20 by keeping the slab 20 under heavy post-compression in the direction of the primary slab spans 20s1 which is in a radial orientation.

In a preferred embodiment, the rib 16 extends vertically from the bottom of the foundation 100 to an elevation near the bottom of the tower base flange 301 to enable the ribs 16 to participate in resisting bearing loads under the tower base flange 301 by increasing the area of the cross-section involved in bearing resistance under the tower base flange 301 and increasing the permissible bearing strength under the base flange 301 or the grout bed 90a and by increasing the bearing area measured at the surrounding faces of the concrete. The geometric configuration and the improvement in bearing resistance, allow concrete with only one relatively low compressive-strength for the entire foundation structure. In contrast, high bearing stresses under the tower base flange 301 in conventional gravity spread footings, requires concrete with higher compressive strength for the pedestal 10 and a lower compressive strength for the slab 20.

The proximity of inner rib ends 16c to the tower base flange 301 allows the inner zones of the ribs 16 to remain under vertical compression stresses caused by vertical post-tensioning forces between embedment ring 54 and tower base flange 301. The vertical compression stress zones in the distal ends of the pedestal 10x improves the confinement conditions and fatigue resistance in the rib inner zones 16c.

Bonded and grouted multi-strand in some applications may be too expensive and take too long to install as it requires an additional step of grouting and may not be economical for some onshore installations. It may then be preferable to use un-bonded, encapsulated mono-strands, arranged in bundles and installed in the foundation reinforcing prior to concrete casting, which reduces construction costs and improves the construction schedule.

In a preferred embodiment post-tensioning in the foundation 100 is made eccentric, to create cambers in the foundation 100 that could result in reduced deflections and improved foundation-soil contact. As an example, the eccentric prestressing of the ribs 16 creates a convex shaped camber in the foundation 100 that helps reduce the deflections under turbine weight and operating loads. Similarly, cambers can be used in perimeter beams 190 and slab sections to reduce slab deflections and improve foundation-soil contact conditions by ensuring a more uniform bearing pressure under the foundation thus allowing for an optimized foundation footprint with more uniform pressure over the effective bearing area.

The vertical profile (elevation) of circumferential tendons 59 in the foundation 100 may be varied at mid spans and under supporting ribs 16 to optimize their utilization.

In another embodiment a gradual transition of geometry at the conjunction of the structural elements is employed to prevent stress concentration and fatigue related problems. As an example, the use of fillets and curved transition ft is desirable at the conjunctions between ribs 16, pedestal 10 and the slab 20.

In a preferred embodiment, the inner ends of the ribs 16 are tapered to a wider cross-section as the rib 16 connects to the pedestal 10, in order to satisfy the high flexural, torsional and shear demands at the inner zone of the ribs 16, and to distribute the multi-axial compression over large surface area to help reduce splitting and bursting reinforcing on the side of the pedestal 10.

In another embodiment low relaxation post-tensioning strands are used to reduce post tension losses over time. Concrete accelerators and plasticizers and other admixtures may be utilized in the concrete mix design. The small thickness of the structural elements may allow for on-site steam curing of the concrete.

A hollow pedestal 10 cross-section may be used, however it can be problematic. A hollow pedestal above the frost depth where there is elevated water table may be problematic. In another embodiment the cross-section of the rib may change and dimensions along its length may change. For example, the section may start rectangular and gradually a top flange may be enlarged to reduce stresses in the upper zone of the rib.

In another embodiment the pedestal 10 may have an enlarged cross-section at the top followed by a transition into a smaller cross-section below. The upper enlarged cross-section may help improve hearing strength at the top of the pedestal below the tower base flange 301a, the bearing washer plate 404b, and the high strength grout bed 90a according to American Concrete Institute design guidelines.

The present invention pertains to a foundation design that overcomes the thermal cracking problem stemming from heat of hydration, in large foundation pours, by using a structural configuration coupled with post-tensioning techniques that reduce the thickness of the structural elements, while increasing the surface area of the concrete pour, thus improving heat dissipation conditions and causing a the ratio of concrete mass to surface area to be roughly 40% to 50% less than in conventional design for inverted T foundations for the same turbine under the same loading and geotechnical conditions.

Figure 37:
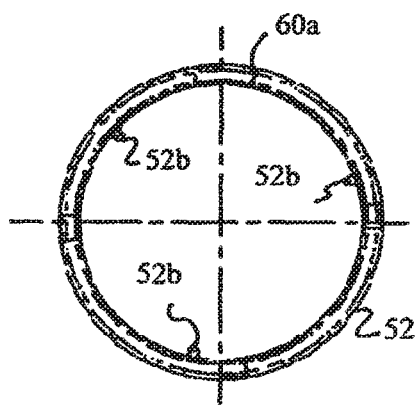
FIG. 37 is a plan view of an anchor bolt template fitted with bolt holes matching that of the tower base flange and having means for holding at least three leveling bolts with inserts.
Figure 38:
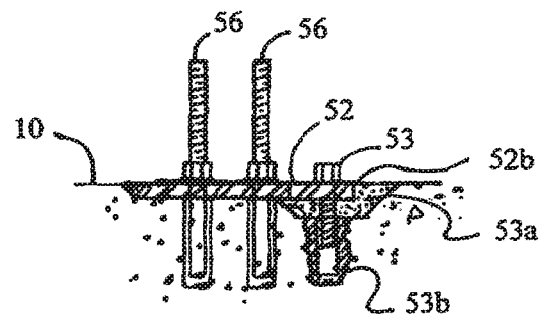
FIG. 38 is a detail of the leveling bolts and corresponding inserts during a concrete pour.
Figure 39:
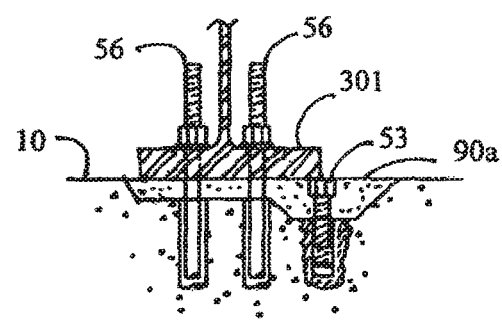
FIG. 39 is a detail of the leveling bolts and corresponding inserts during leveling and grouting of a tower base flange.

As shown in FIG. 37, FIG. 38 and FIG. 39, a tower base leveling and grouting method can be used which does not employ tower anchor bolts for leveling, or leveling shims which cause undesirable stress concentration at shim locations which could lead to localized fatigue failure at shim locations. The new method employs the bolt template 52 at the very top of the bolt assembly 60 with at least three sets of additional leveling bolts 53 and corresponding threaded bolt inserts 53b suitable for embedment into concrete. The leveling bolts 53 and inserts 53b may be located outside or inside the bolt circle 60a of the tower base, but directly under the tower base flange 301a. This allows for continuity of the grout bed 90a construction and provides an easy access for leveling bolts 53. Small cutouts 53a connected at leveling bolt locations can be used. Another benefit of this leveling technique is having the ability to apply a continuous grout bed 90a that is free of construction joints, under tower base 301 in one session and to have the ability to tension all the anchor bolts 56 in one session.

The present invention improves safety and accessibility around foundations during construction and reduces hazardous conditions for construction crews. This goal is achieved by using reusable form sections 102 that are fitted with platform sections for forming an access platform around the foundation. The form may also connect to at least one access ramp extending beyond the edge of the foundation. The platform and the ramp are fitted with a slip-resistant walking surface and the elevated ramps are provided with guardrails and designed to applicable industry safety standards. Further, the relatively thin slab thickness minimizes the risk of worker injury during construction.

A transformer pad can be supported on precast concrete posts extending vertically from the foundation.

Pedestal forms 102 may have openings for running electrical and communication conduits there through thus preventing problems stemming from randomly placing the conduits in areas that could compromise the structural design.

The ribs 16 may have means for receiving and supporting prefabricated trays (or electrical duct banks) for housing power and communication cables.

The foundation design can also be adapted for offshore wind turbine projects. In this case the foundation 100 may be assembled on a barge or dry dock then transported or floated to its destination and lowered into a prepared seabed location. The foundation can be weighed down in place by backfilling it with suitable material. The offshore foundation 100 may be configured to receive any type of offshore piers 404, suction piers 403, piles 400, micro-piles 401, anchors 404 or any combination of the above.

Figure 42:
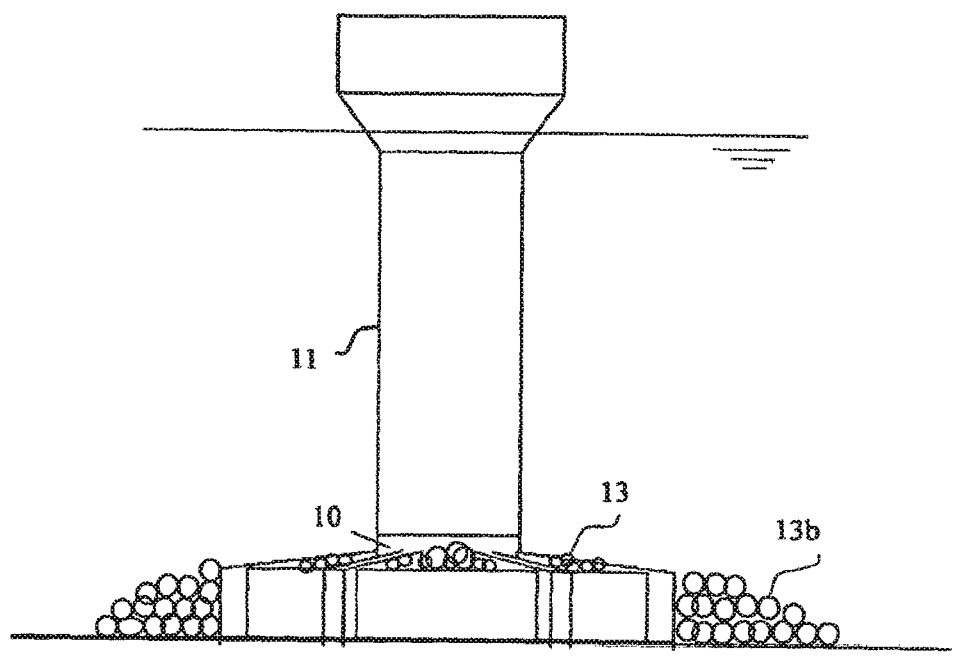
FIG. 42 is an elevation view of art offshore foundation during installation. The foundation is stabilized with ballast over the base and inside the stem. Scour protection measures are added around the perimeter of the base.

In another embodiment of the invention as shown in FIG. 42, an offshore concrete foundation 100 with high stiffness and improved fatigue resistant comprising: 1. a support slab-on-grade 20 of non-segmented continuous construction covering the entire footprint of the foundation and having (horizontal) diametric and perimeter post-tensioning elements, 2. a central pedestal 10 integral with the support slab-on-grade 20 of solid non-segmented construction and having vertical post-tensioning elements and also having reinforcing elements of rebar to carry loads diametrically across the pedestal 10; 3. a cylindrical or conical stem 11 extending vertically above the pedestal 10 and being fixed to the pedestal 10, and having a hollow cross section, of equal size or smaller than that of the pedestal 10, and may be constructed with segmented or non-segmented construction methods and could be made with typical cast in place over the pedestal 10 by using typical construction methods for tall cylindrical concrete structures such as continuous forming, successive pours, segmental construction with precast concrete panels or other known construction methods used conventionally for conical or cylindrical concrete structures such as chimneys, and the stem 11 is kept under heavy concentric vertical post-compression stress by an array of circumferentially arranged vertical post-tensioning elements 70, and the stem 11 may have an ice cone 11b, or tower receiving adaptor, integral with the top of stem 11, and the stem 11 having means for fixing a tower base 301 of a wind tower 300, the stem 11 and the ice cone 11b are vertically and circumferentially prestressed with vertical and circumferential post tensioning elements, 4. ribs 16 integral with the support slab 20 and the central pedestal 10, on top of the slab-on-grade, with pairs of ribs 16 radially extending from opposite sides of the pedestal 10 with post-tensioning elements extending radially and diagonally from the distal ends 16x of the ribs 16 through the pedestal 10 and keeping the ribs 16 and the pedestal 10 under heavy eccentric post compression stress and reinforcing dowels 46 extending from the ribs 16 into the pedestal 10 and spliced with pedestal 10 reinforcing, 5. deep perimeter beams 190 extending continuously around the foundation, made of concrete integral with the support slab-on-grade 20 and the ribs 16 and having continuous perimeter or circumferential post tensioning elements. When the concrete sets, the post-tensioning elements are jacked and the anchor bolts are post-tensioned such that the foundation is kept under heavy multi-axial post-compression.

The offshore foundation 100 is constructed on a barge or in a dry dock and then floated or transported to an offshore installation site and lowered to be placed over a prepared sea bed. A suitable backfill material 13 is placed over the foundation 100 to stabilize the foundation against overturning. Scour protection measures 13b are provided around the foundation. The foundation may be built with marine cement and marine grout and kept under heavy multi-axial horizontal and vertical prestress using bonded and grouted post tensioning systems rated for double corrosion protection and suitable for a marine environment.

Figure 40:
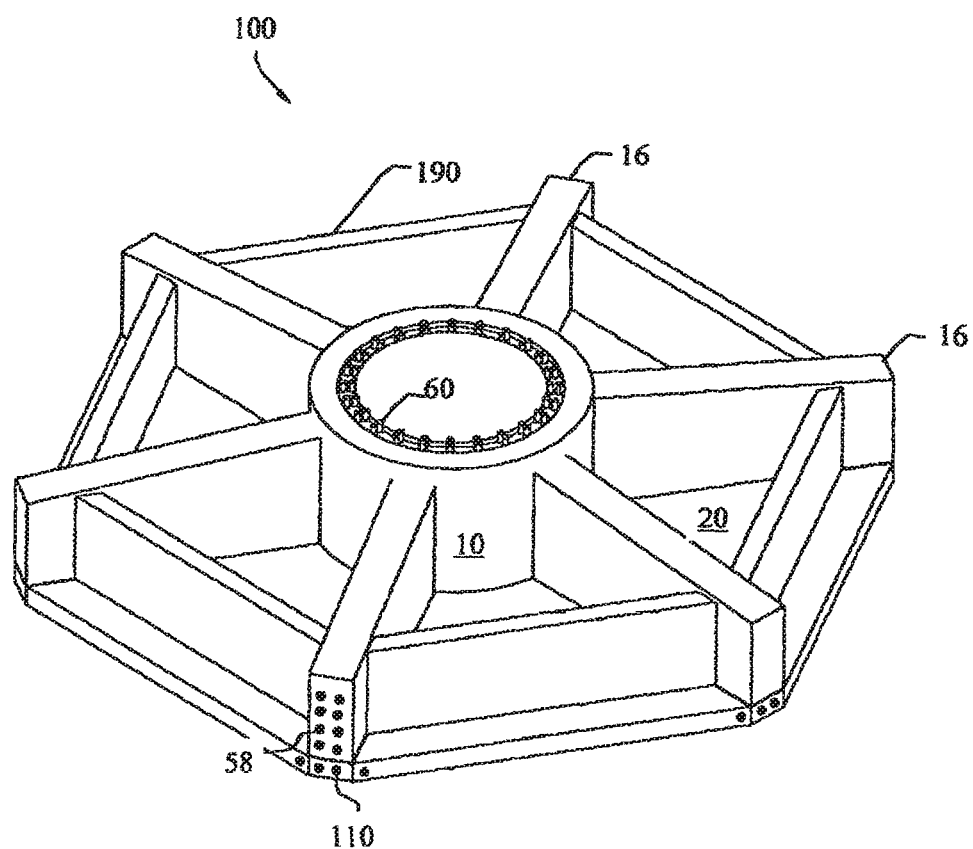
FIG. 40 is a perspective view of the bottom segment of a partially prefabricated offshore foundation ready to receive a prefabricated metal or concrete stem atop the pedestal.
Figure 41:
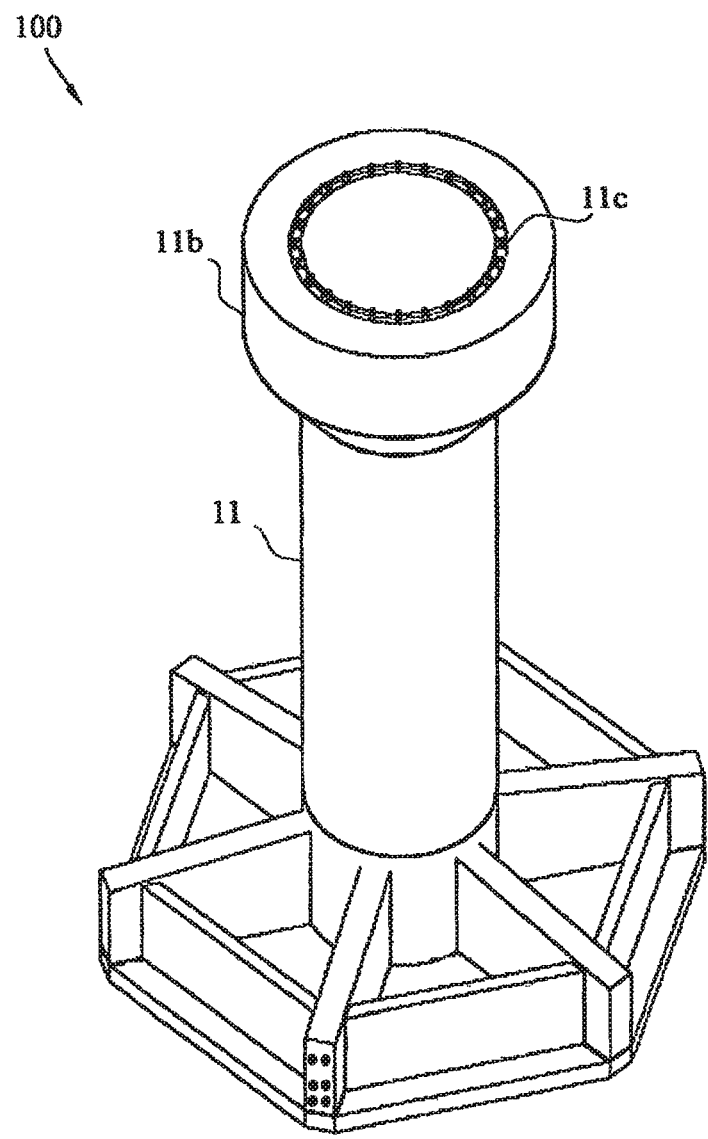
FIG. 41 is a perspective view of a completed partially prefabricated offshore foundation with a prefabricated concrete stem atop the pedestal. Vertical post tensioning elements with marine grouting methods, such as grouted loop anchors are used to connect the prefabricated stem to the pedestal.

In another embodiment as shown in FIG. 40, an offshore foundation for wind turbines comprises the following elements: 1. A vertically extending pedestal that is cast in situ, on a barge, out of concrete, the pedestal has an integral long stem 11 for receiving and supporting a tower structure; 2. A substantially horizontal support slab 20 that is cast in situ, on a barge, out of concrete, the support slab 20 covering an area of ground larger than that covered by the pedestal 10; 3. A plurality of radial ribs 16 extending radially outwardly from the pedestal 10 and spaced around the pedestal 10, each rib being prefabricated and being joined along the base thereof to the support slab 20 when the support slab 20 is cast in situ and being joined along an inner side thereof to the pedestal 10 when the pedestal 10 is cast in situ; 4. A plurality of prefabricated perimeter beams 190 spanning continuously, near the perimeter of the foundation 100, between ribs 16 and supporting the slab 20; 5. Backfill 13 for weighing down the foundation, resisting tower loads and providing scour protection 13b.

When the concrete sets, the precast components will become integral with a cast-in-place components. Radial post-tensioning tendons extend from the distal end of one rib through the rib and the pedestal to the distal end of the opposite rib. Vertical post-tensioning is arranged in the pedestal 10 as well. The stem 11 and the ice cone 11 b may also benefit from circumferential post-tensioning 59t.

The pedestal 10 has means for receiving and supporting a tower 300 or pylon. The upper portion of the pedestal 10 (the stem 11) may be made in multiple consecutive cast in situ pours, depending on its height. Alternatively, the stem 11 may be made by joining precast segments with circumferential 59t and vertical 70 post-tensioning to form the stem 11 as in segmented concrete tower construction.

In another embodiment of the invention, as shown in FIG. 42, a wind turbine foundation may be fabricated on a barge with precast concrete elements. The barge surface is prepared with a non-bonding agent or a thin membrane at the foot print where the foundation is to be built. Lower slab reinforcing mesh sections are assembled and placed on the barge and the pedestal cage reinforcing is assembled at the center of the foundation. Upper slab reinforcing mesh sections 24 may follow after the slab post tension duct 58dc is placed. Precast concrete ribs 16 are placed in a radial array around the pedestal cage 50 and precast concrete perimeter beams 190 are arranged around the perimeter of the foundation 100p. Post tensioning ducts 58dc in the pedestal space 10 and at perimeter beam-to-rib connections 59dc are placed to pair with their corresponding duct in the precast members. Forms for the pedestal 10 and for closure pours at rib-to-perimeter beam connections are installed. The slab concrete is poured followed by pedestal 10 concrete and closure pours at the rib-to-pedestal connections. The stem 11 is fabricated possibly in multiple consecutive pours depending on pedestal height. The stem 11 design may incorporate an ice cone 11b at its top. The post tensioning tendons are then installed. The jacking and grouting of tendons is then carried out. Some pylon sections may be installed prior to transportation. The finished foundation 100 is transported to its offshore installation site using a suitable means of transportation such as towing the barge.

Figure 46:
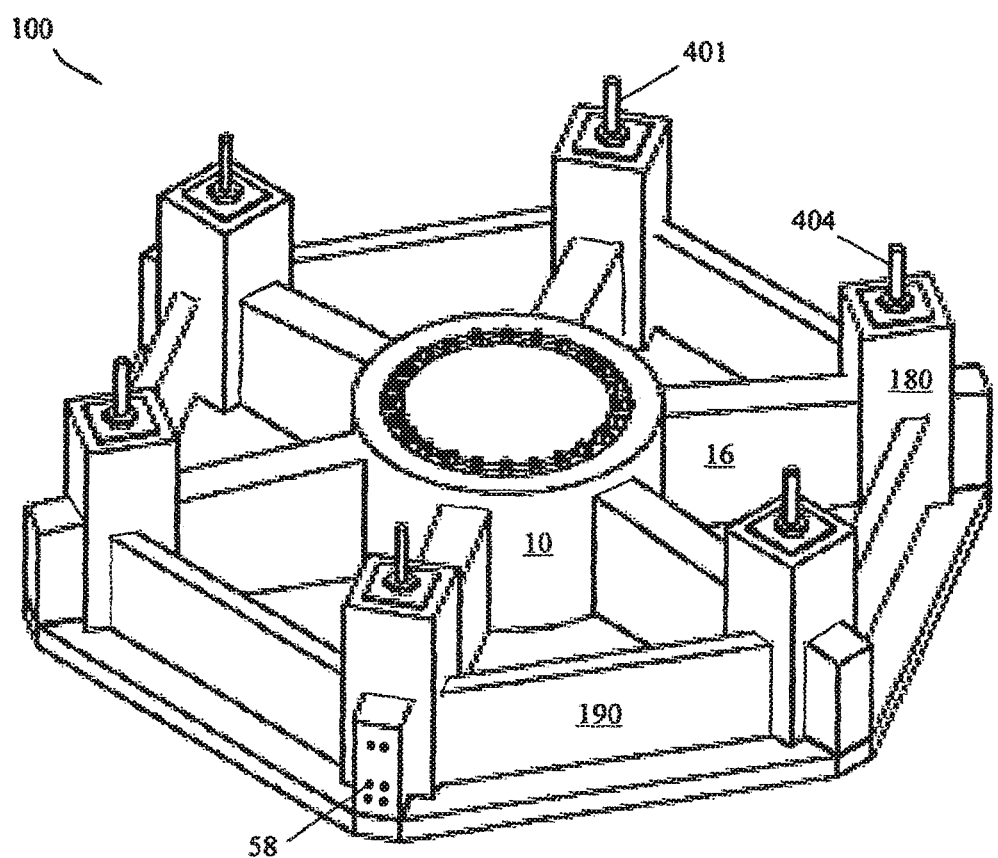
FIG. 46 is a perspective view of the foundation.

In another embodiment of the offshore foundation comprises the following elements as shown in FIG. 46: 1. A vertically extending pedestal 10 is cast in situ, on a barge or dry dock, out of concrete; 2. A substantially horizontal support slab 20 is cast in situ, on a barge or dry dock, out of concrete, the support slab 20 covering an area larger than that covered by the pedestal 10; 3. A plurality of radial ribs 16 extends radially outwardly from the pedestal 10 and spaced around the pedestal 10, each rib being prefabricated and being joined along the base thereof to the support slab when the support slab 20 is cast in situ and being joined along an inner side thereof to the pedestal 10 when the pedestal is cast in situ, each rib has an integral pier 180 for receiving a leg 210 of lattice tower 200; 4. A plurality of perimeter beams 190 spanning continuously, near the perimeter of the foundation 100, between ribs 16 and supporting the slab 20, optionally each perimeter beam can be prefabricated; 5. A lattice tower 200 has a plurality of legs 210 structurally connected to the integral piers 180 in the ribs 16, the lattice tower 200 has, at its top, a means for receiving and structurally supporting a pylon or a tower 300; 6. Suitable offshore backfill 13 for weighing down the foundation, resisting tower loads and providing scour protection 13b.

When the concrete sets, the pre-cast components will become integral with the cast-in-place components. Radial post-tensioning tendons extend from rib ends 16x to the opposite rib ends 16x across the pedestal 10. Vertical post-tensioning is arranged in the pedestal 10 as well. The structural behavior is improved by the added compression in all ribs 16, edge beams 190, slab 20 and center pedestal 10.

The lattice tower 200, preferably incorporating 3-dimensional trusses 200tr, transfers the pylon loads down to the concrete foundation 100. The lattice tower 200 may get connected to the concrete foundation prior to transportation or it can be connected to the foundation at final offshore installation site.

In another embodiment of the invention as shown in FIG. 46, a wind turbine foundation is fabricated on a barge with precast concrete element as following. The barge surface is coated with a non-bonding agent or covered with a thin membrane at the foot print where the foundation 100 is to be built. Lower slab reinforcing mesh sections are assembled and placed in the slab area and the pedestal cage 50 reinforcing is assembled at the center of the foundation. Upper slab reinforcing mesh sections may follow after the slab post tension ducts are placed. Precast concrete ribs 16 are placed in a radial array around the pedestal cage 50 and precast concrete perimeter beams 190 are arranged around the perimeter of the foundation 100p, post tensioning ducts in the pedestal space and at perimeter beam-to-rib connections are placed to pair with corresponding duct in the precast members. Forms for the pedestal and for closure pours at the rib-to-perimeter beam connections are installed. Slab concrete is poured followed by pedestal concrete and closure pours at rib-to-pedestal connections. A lattice tower 200 structure is prefabricated and mounted atop the concrete foundation 100. The foundation is transported to the installation site using a suitable means of transportation. The seabed is prepared for receiving the foundation by placing a sub-base of suitable material such as crushed stone. The foundation is backfilled and scour protection measures 13b are installed.

Figure 31:
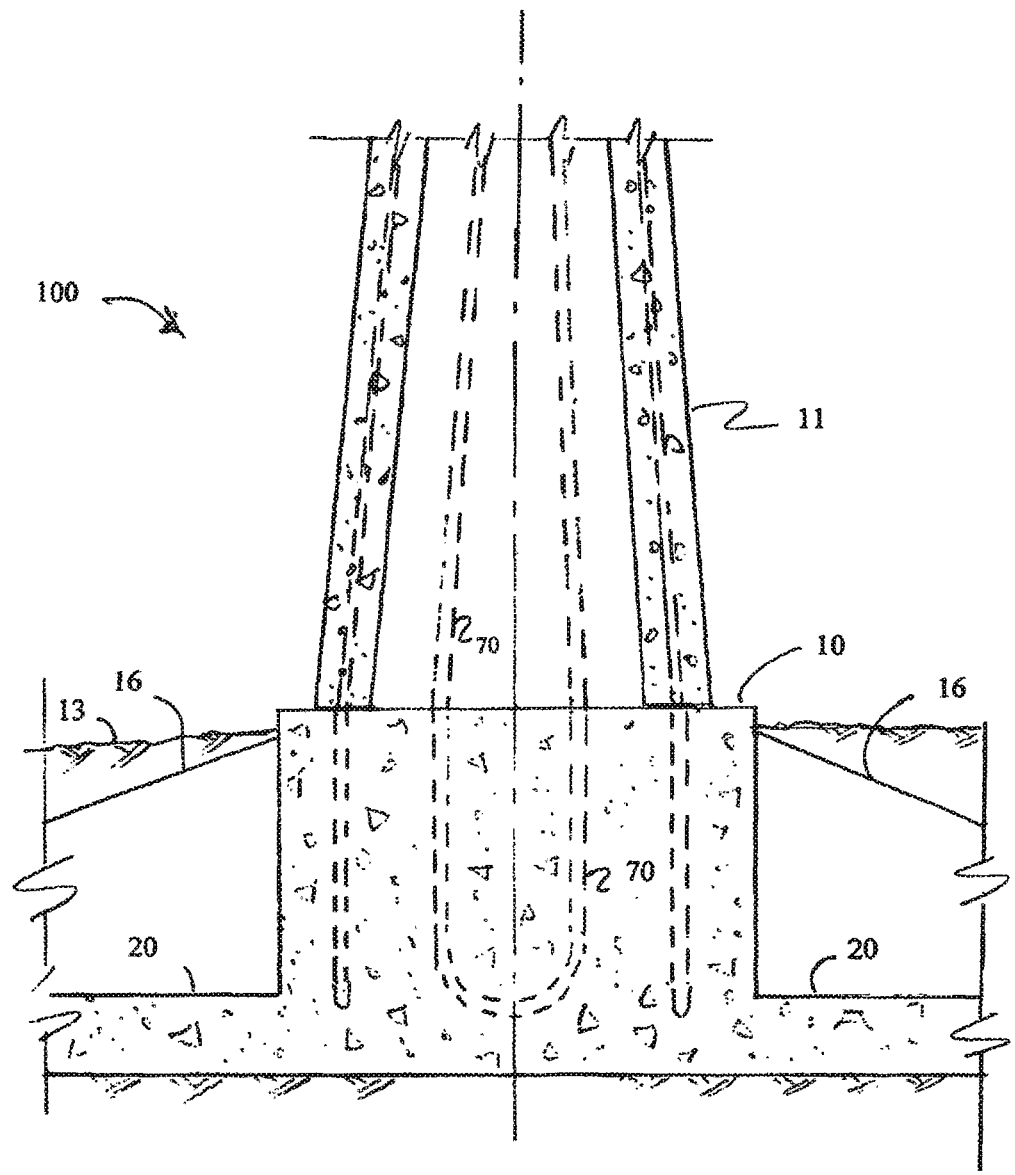
FIG. 31 is a section of a foundation comprising a concrete stem extending above the pedestal and the post tension duct with loop anchors are a arranged to facilitate the vertical post tensioning of the stern and the pedestal.
Figure 32:
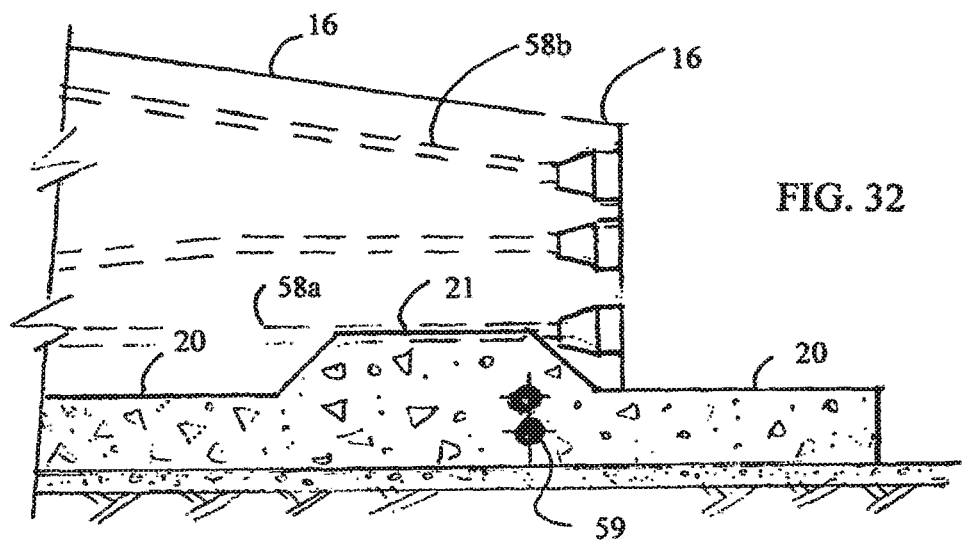
FIG. 32 is a detail that shows perimeter and radial post tensioning in a foundation with a cantilevered slab edge that extends beyond a thickened slab ring.
Figure 33:
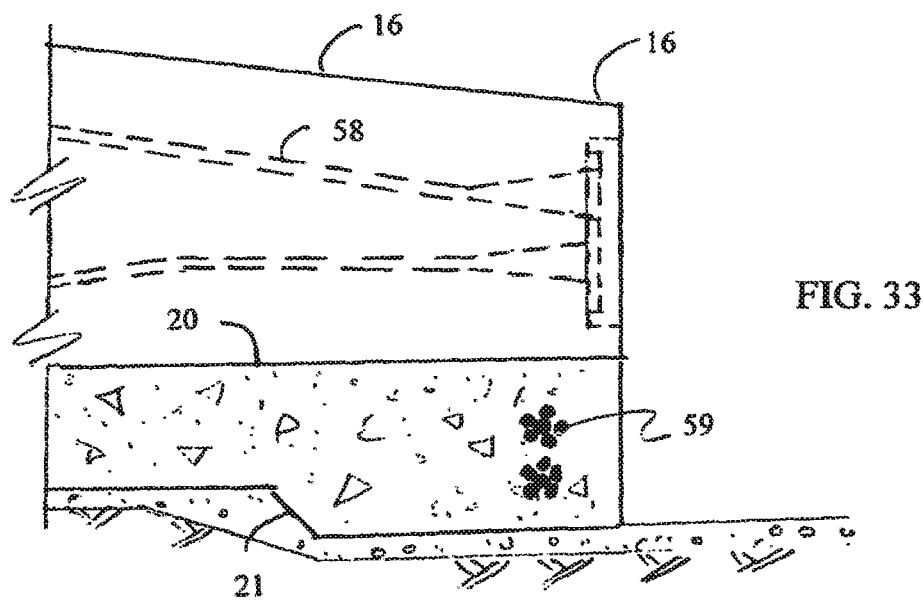
FIG. 33 is a detail that shows perimeter and radial post tensioning in a foundation with a thickened slab edge.

In another embodiment of the invention, as shown in FIG. 31, the stem 11 is prefabricated separately and provided with a means for connecting to the pedestal 10, preferably an array of vertical post tensioning dowels 70 extended through the pedestal 10 and the stem 11 or other segmental post tensioning joining methods may be used. The pedestal may be fitted with a means for receiving the prefabricated stem 11 based on segmental post tensioning and grouting construction methods.

Piles 400, Micro-piles 401 or piers 402 or suction piers 403 or anchors 404 can be used with the offshore foundation 100 in a similar manner as previously described in the application. In this case vertical sleeves will be arranged in the foundation to receive an array of piles 400 or anchors 404 extending through the foundation, to allow for additional loading capacity and improve the stability of the foundation. Piles 400 are secured to the foundation by filling the sleeves with marine grout.

Under some conditions, the use of piles 400, piers 402 or suction piers 403 or anchors 404 may eliminate the slab 20 and/or the perimeter beams 190 from the design. In another embodiment shown in FIG. 43 the foundation 100 with perimeter beams 190 has a pedestal 10 which supports a concrete stem 11 having a steel tower 600 thereon.

Obviously, many modifications and variations of the present invention are possible in light of the above teachings. It is therefore to be understood that, within the scope of the invention.

The invention claimed is:

1. A method of constructing a foundation having a continuous slab, a pedestal, and a plurality of tapered cantilevered girders comprising the following steps:
   a) preparing the site including the placement of a mud slab of plain concrete or equivalent construction barrier over a subgrade at the bottom of an excavation pit;
   b) placing an anchor-bolt cage and foundation reinforcement at the excavation pit;
   c) installing formwork including a slab form, an array of cantilevered girder forms and a pedestal form;
   d) placing flowable concrete inside the said forms and allowing the concrete to harden such that the cantilevered girders become integral with a support slab and integral with the pedestal when the concrete hardens forming a monolithic foundation;
   e) removing the formwork;
   f) curing the concrete;
   wherein:
   Step b) is carried out in the following sub-steps:
      b1) placing the foundation reinforcement of the base slab with an upper and a lower horizontal rebar mesh therein;
      b2) placing in position an anchor-bolt cage with leveling and positioning means connected to the anchor-bolt cage to ensure its proper positioning and vertical alignment;
      b3) placing reinforcement of the pedestal comprising a vertically extending and tightly meshed pedestal cage assembly around the said anchor-bolt cage;
      b4) and placing an array of tapered cantilevered girders reinforcement cages around the said anchor-bolt cage, the said girder reinforcing cages having vertical stirrups and flexure reinforcing with deep dowels extending into the pedestal cage assembly and vertical dowels extending from the tapered cantilevered girders into the slab at spaced intervals; and
   Step f) is carried out by onsite curing of the foundation in a controlled manner.

2. A method of constructing a foundation according to claim 1, wherein the step of curing the concrete comprises supplying moisture thereto.

3. A method of constructing a foundation according to claim 2, wherein the moisture is supplied in the form of steam to allow for steam curing of the concrete.

4. A method of constructing a foundation according to claim 1, wherein means for control of the curing environment, including temperature and humidity around the foundation are deployed at the foundation during the curing step.

5. A method of constructing a foundation according to claim 4, wherein the means for controlling the curing around the foundation site further includes at least one of blankets, covers, shields, fans, and heaters.

6. A method of constructing a foundation according to claim 1, wherein the support slab has a circular or a polygonal shape.

7. A method of constructing a foundation according to claim 1, wherein the support slab has one of uniform thickness or and a sloped surface between the pedestal and an outer edge of the support slab to facilitate drainage away from the foundation.

8. A method of constructing a foundation according to claim 1, wherein the pedestal has one of a cylindrical and a polygonal shape.

9. A method of constructing a foundation according to claim 1, wherein the cantilevered girders have the shape of a triangular prism.

10. A method of constructing a foundation according to claim 1, wherein the said cantilevered girders have a tapered rectangular shape of uniform thickness and with a decreasing height dimension when progressing from the pedestal toward an outer edge of the support slab.

11. A method of constructing a foundation according to claim 1, wherein the cantilevered girders include deep dowels inserted into the pedestal to provide structural fixity to the pedestal and a height tapering down as the cantilevered girders cantilever out from the pedestal.

12. A method of constructing a foundation according to claim 1, wherein the pedestal is adapted to support a tower that is adapted to be coupled to a wind turbine.

13. A method of constructing a foundation according to claim 1 further comprising, the step of backfilling the foundation with a backfill material to help stabilize the foundation.

14. A method of constructing a foundation according to claim 13 further comprising, compacting the backfill material.

15. A method of constructing a foundation according to claim 12 further comprising, placing a tower base section with a tower base flange having bolt apertures for receiving anchor-bolts of the anchor-bolt cage on top of the pedestal.

16. A method of constructing a foundation according to claim 15 further comprising, providing means on the top of pedestal for providing a gap between the pedestal and the tower base flange and placing high compressive strength material therein.

17. A method of constructing a foundation according to claim 16 further comprising, providing a bearing washer-plate in the gap between the pedestal and the tower base flange to reduce bearing stress.

18. A method of constructing a foundation according to claim 16 further comprising, placing a grout-bed of a high compressive strength material in the gap over the pedestal.

19. A method of constructing a foundation according to claim 18 further comprising, placing nuts on the anchor-bolts and tensioning the bolts to generate heavy post compression stress in the foundation after the grout has hardened.

20. A method of constructing a foundation according to claim 15 wherein the tower base supports a wind turbine tower.

21. A method of constructing a foundation according to claim 1 further comprising, pouring the slab concrete, girder concrete and pedestal concrete in one continuous pour.

22. A method of constructing a foundation according to claim 1 further comprising, pouring the slab concrete in a first pour and subsequently pouring the concrete for the pedestal and cantilevered girders conjointly in a second pour.

23. A method of constructing a foundation according to claim 19 further comprising, tensioning the anchor-bolts to a specified force for applying heavy post compression stress onto the pedestal and to ensure that no loss of contact between the base flange and the pedestal would occur during the operation of wind turbine.

24. A method of constructing a foundation according to claim 1 and further including a step of coating the foundation with protective material for extending the life span thereof.

25. A method of constructing a foundation according to claim 1, wherein and the cantilevered girders have deep dowels extending between the anchor-bolts and into the pedestal.

26. A method of constructing a foundation according to claim 1, wherein the anchor-bolt cage has an embedment ring near a base of the pedestal and a tower base flange is at the top of the pedestal with vertical anchor-bolts extending between the embedment ring, and tower base flange to allow vertical post tensioning of the foundation.

27. A method of constructing a foundation according to claim 11, wherein step (b) further includes the arrangement of the cantilevered girders in a circumferentially spaced manner around the pedestal such that the pedestal is laterally confined at spaced intervals through a predetermined portion of the height dimension of the pedestal to enhance the bearing capacity thereof.

28. A method of constructing a foundation according to claim 11, wherein the cantilevered girders are radially placed in pairs on opposite sides of the pedestal such that tower loads are resisted by pairs of girders on distal ends of the pedestal, wherein each pair of girders and the pedestal form a continuous, non-segmented, laterally supported, reinforced concrete girder extending between distal ends of the foundation with continuous composite action from the slab-on-grade.

29. A wind turbine foundation made in the method of claim 1 comprising a concrete support slab having horizontal rebar therein, a vertically prestressed concrete pedestal integral with the support slab having vertical rebar therein, a plurality of tapered cantilevered girders on top of and integral with the support slab and integral with the pedestal, the cantilevered girders having connection elements extending from the ribs into the pedestal and from the ribs into the slab, vertical stirrups embedded in the slab and the cantilevered girders along the length of the cantilevered girders and rebar running between the stirrups in the slab and in the cantilevered girders the length of the cantilevered girders and extending towards the pedestal.

\* \* \* \* \*